(12) United States Patent
Roy

(10) Patent No.: US 11,952,010 B1
(45) Date of Patent: Apr. 9, 2024

(54) AUTOMATICALLY ADJUSTABLE STEERING GEOMETRY FOR AUTONOMOUS VEHICLE

(71) Applicant: Matthew MacGregor Roy, Ottawa (CA)

(72) Inventor: Matthew MacGregor Roy, Ottawa (CA)

(*) Notice: Subject to any disclaimer, the term of this patent is extended or adjusted under 35 U.S.C. 154(b) by 361 days.

(21) Appl. No.: 17/086,416

(22) Filed: Nov. 1, 2020

Related U.S. Application Data

(60) Provisional application No. 62/944,368, filed on Dec. 6, 2019.

(51) Int. Cl.
*B60W 60/00* (2020.01)
*B60W 30/09* (2012.01)
*B62D 15/02* (2006.01)

(52) U.S. Cl.
CPC .......... *B60W 60/001* (2020.02); *B60W 30/09* (2013.01); *B62D 15/021* (2013.01); *B60W 2420/408* (2024.01); *B60W 2520/12* (2013.01)

(58) Field of Classification Search
None
See application file for complete search history.

(56) References Cited

U.S. PATENT DOCUMENTS

| | | | |
|---|---|---|---|
| 10,759,416 B1 | 9/2020 | Funke | |
| 10,821,981 B1 * | 11/2020 | Funke | B62D 7/159 |
| 2006/0064275 A1 * | 3/2006 | Phillips, III | G01B 11/275 |
| | | | 702/154 |
| 2010/0326762 A1 * | 12/2010 | Avigni | B62D 3/12 |
| | | | 180/400 |
| 2016/0144890 A1 * | 5/2016 | Kim | B62D 6/002 |
| | | | 701/41 |
| 2017/0282971 A1 * | 10/2017 | Yanez | B62D 5/001 |
| 2018/0210447 A1 * | 7/2018 | Myers | B60W 40/02 |
| 2019/0039651 A1 * | 2/2019 | Brok | B62D 6/00 |
| 2019/0143786 A1 * | 5/2019 | Saha | F01P 7/048 |
| | | | 180/68.1 |
| 2019/0164363 A1 | 5/2019 | Javid | |
| 2019/0258251 A1 * | 8/2019 | Ditty | G06F 15/7807 |
| 2020/0223270 A1 * | 7/2020 | Kunkel | B62D 17/00 |
| 2020/0307344 A1 * | 10/2020 | Hille | B60G 17/01908 |

FOREIGN PATENT DOCUMENTS

JP       2007210497 A  *  8/2007

OTHER PUBLICATIONS

M. Hubner, T. Stork, U. Becker and E. Schnieder, "Lateral stabilization of vehicle-trailer combinations against crosswind disturbances by means of sliding control," 2008 16th Mediterranean Conference on Control and Automation, 2008, pp. 431-438, doi : 10.1109/MED.2008.4602075. (Year: 2008).*
Machine translation of JP2007210497A (Year: 2023).*
Wikipedia Article "Ackermann Steering Geometry". (Year: 2023).*

* cited by examiner

*Primary Examiner* — Aniss Chad
*Assistant Examiner* — Jennifer M Anda

(57) ABSTRACT

An autonomous vehicle comprises a chassis, a pair of front wheels rotationally mounted to the chassis, a steering mechanism connected to the front wheels, wherein the steering mechanism is characterized by a steering geometry, a vehicle dynamics prediction module for predicting a vehicle dynamics condition and for generating a control signal based on the vehicle dynamics condition, and a steering geometry adjustment mechanism connected to the steering mechanism for automatically adjusting the steering geometry in response to the control signal.

10 Claims, 35 Drawing Sheets

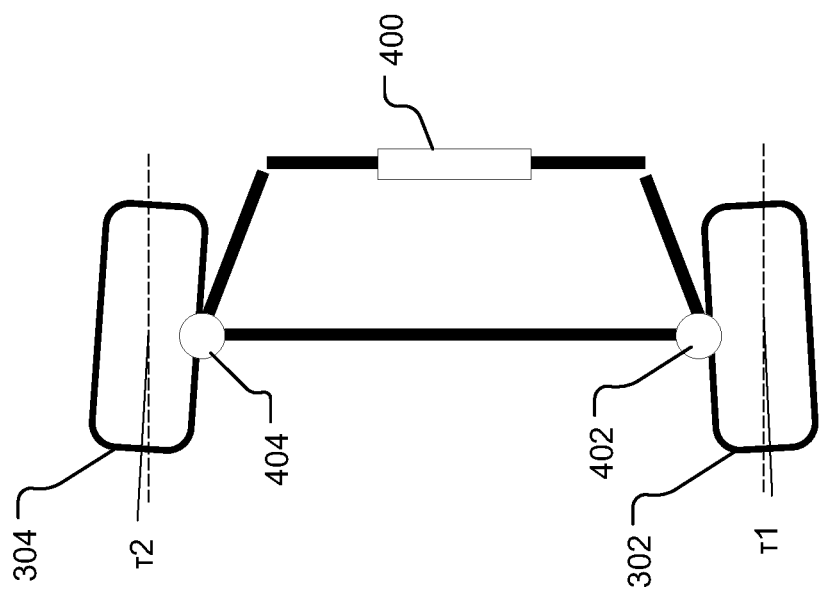
FIG. 21

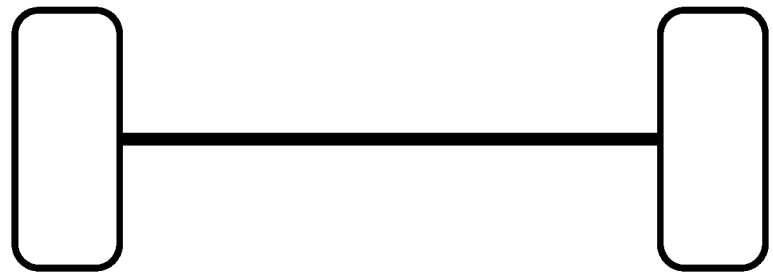
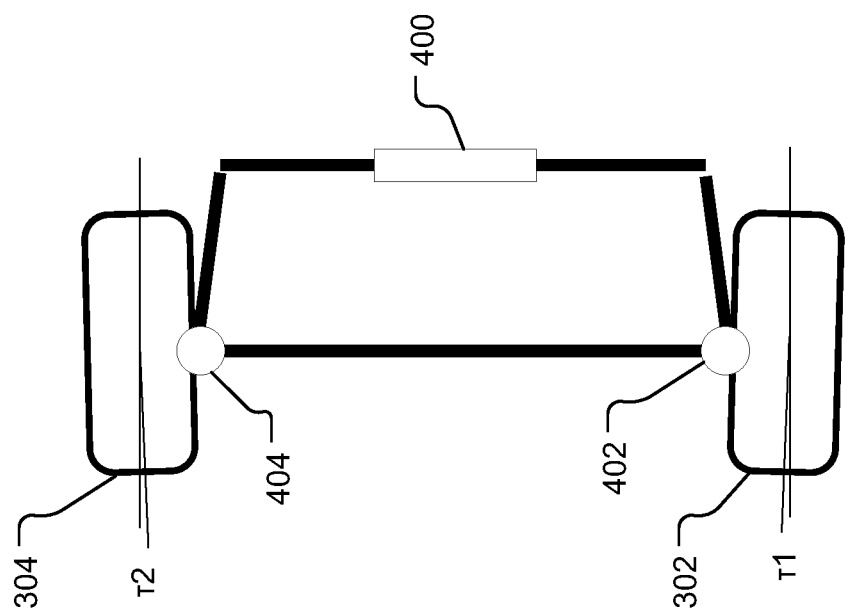
FIG. 22

AUTOMATICALLY ADJUSTABLE STEERING GEOMETRY FOR AUTONOMOUS VEHICLE

CROSS-REFERENCE TO RELATED APPLICATIONS

This application claims priority from U.S. Provisional Patent Application 62/944,368 entitled "Automatically Adjustable Steering Geometry for Autonomous Vehicle" filed Dec. 6, 2019.

TECHNICAL FIELD

The present invention relates generally to self-driving or autonomous vehicles and, in particular, to technologies for automatically adjusting the steering geometry of a steering mechanism of an autonomous vehicle.

BACKGROUND

Autonomous or self-driving vehicles use sensors such as RADAR, LIDAR and/or cameras to provide signals to a processor or controller that generates and outputs steering, acceleration and braking signals to the vehicle to thereby autonomously drive the vehicle without direct user control. A Global Navigation Satellite System (GNSS) receiver such as a Global Positioning System (GPS) receiver is also used for navigation. As the self-driving vehicle drives autonomously toward a destination, the vehicle may encounter obstacles or other vehicles. Self-driving vehicles use various sensors for collision avoidance. An autonomous vehicle has a steering mechanism that is automatically controlled by a processor or controller. A conventional autonomous vehicle has a fixed steering geometry. The steering geometry may be characterized by a toe angle and/or an Ackerman angle.

U.S. Pat. Nos. 9,919,736 and 6,283,483, which are hereby incorporated by reference, have disclosed electro-mechanical systems that electronically control actuators to adjust the steering geometry to optimize Ackerman steering angles when turning. These electro-mechanical systems react to driver input by sensing rotation of the steering wheel and thus may suffer from lag times, limiting the efficacy of such systems. U.S. Pat. No. 10,029,728, which is hereby incorporated by reference, has disclosed a load detection device that measures loads on tires and adjusts toe accordingly. Again, there would be a lag in reacting to rapid changes in load. U.S. Pat. No. 10,488,172 has disclosed a rollover prevention system which adjust toe angles to avoid a rollover based on sensor data obtained while taking a curve. The lag in adjusting the toe to compensate for the sensed forces is problematic.

A new or improved technology to dynamically adjust the steering geometry of a steering mechanism of an autonomous vehicle is highly desirable.

SUMMARY

In general, the present invention provides an autonomous (self-driving) vehicle that predicts a vehicle dynamics condition (e.g. forces due to cornering) and automatically adjusts the steering geometry of the steering mechanism of the vehicle so that the vehicle's performance (e.g. cornering performance) is enhanced. The steering geometry may be adjusted pre-emptively, i.e. prior to a vehicle dynamics condition occurring, e.g. prior to reaching a corner. Steering geometry may be adjusted to improve range (fuel economy or battery life), to improve steering responsiveness, to improve straight-line tracking, or other driving characteristics.

One inventive aspect of the disclosure is an autonomous vehicle comprising a chassis, a pair of front wheels rotationally mounted to the chassis, a steering mechanism connected to the front wheels for steering the front wheels, and a pair of rear wheels that is also rotationally mounted to the chassis. The vehicle includes a vehicle dynamics prediction module for predicting a vehicle dynamics condition and for generating a control signal based on the vehicle dynamics condition. The vehicle also includes a steering geometry adjustment mechanism connected to the steering mechanism for automatically adjusting a steering geometry in response to the control signal.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which:

FIG. 21 schematically depicts a vehicle with its front wheels in a toe-out configuration.

FIG. 22 schematically depicts a vehicle with its front wheels in a toe-in configuration.

It will be noted that throughout the appended drawings, like features are identified by like reference numerals.

DETAILED DESCRIPTION

Figure 1:
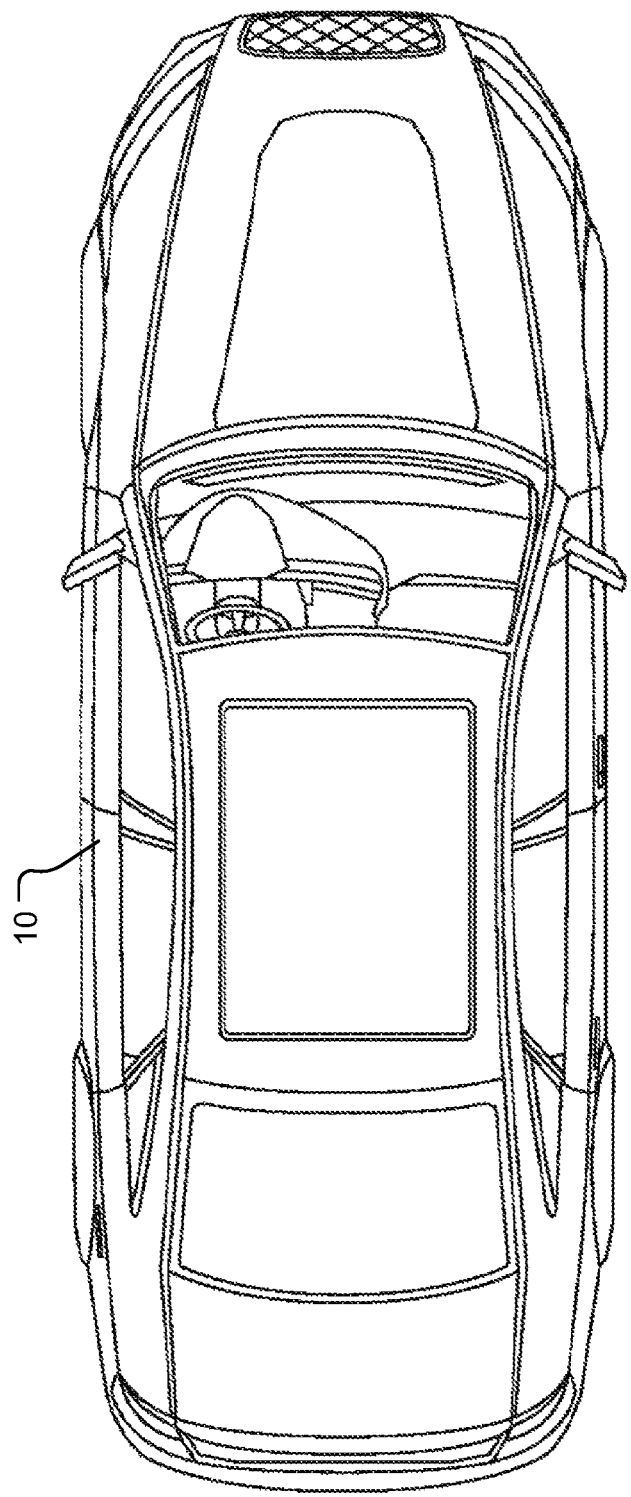
FIG. 1 is a top view of an autonomous ("self-driving") vehicle in accordance with an embodiment of the present invention.
Figure 2:
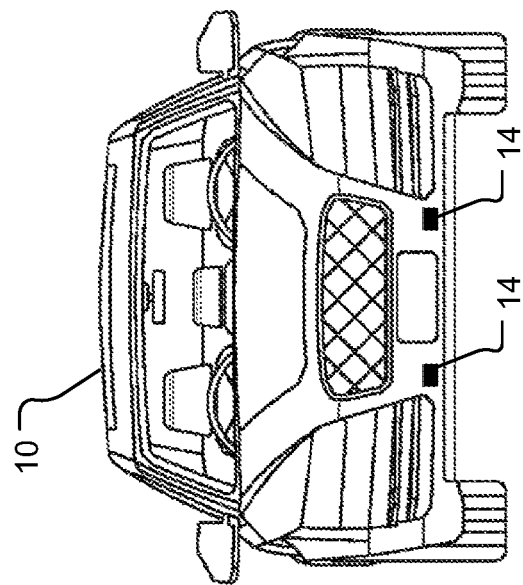
FIG. 2 is a front view of the autonomous vehicle of FIG. 1.
Figure 3:
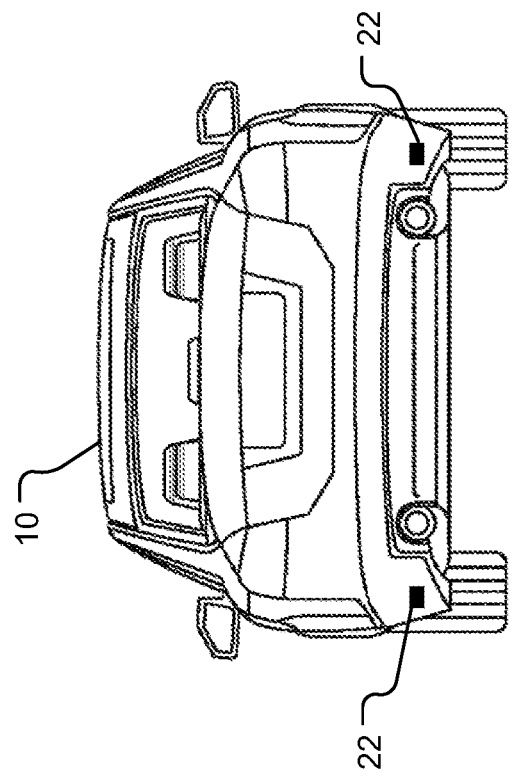
FIG. 3 is a rear view of the autonomous vehicle of FIG. 1.
Figure 4:
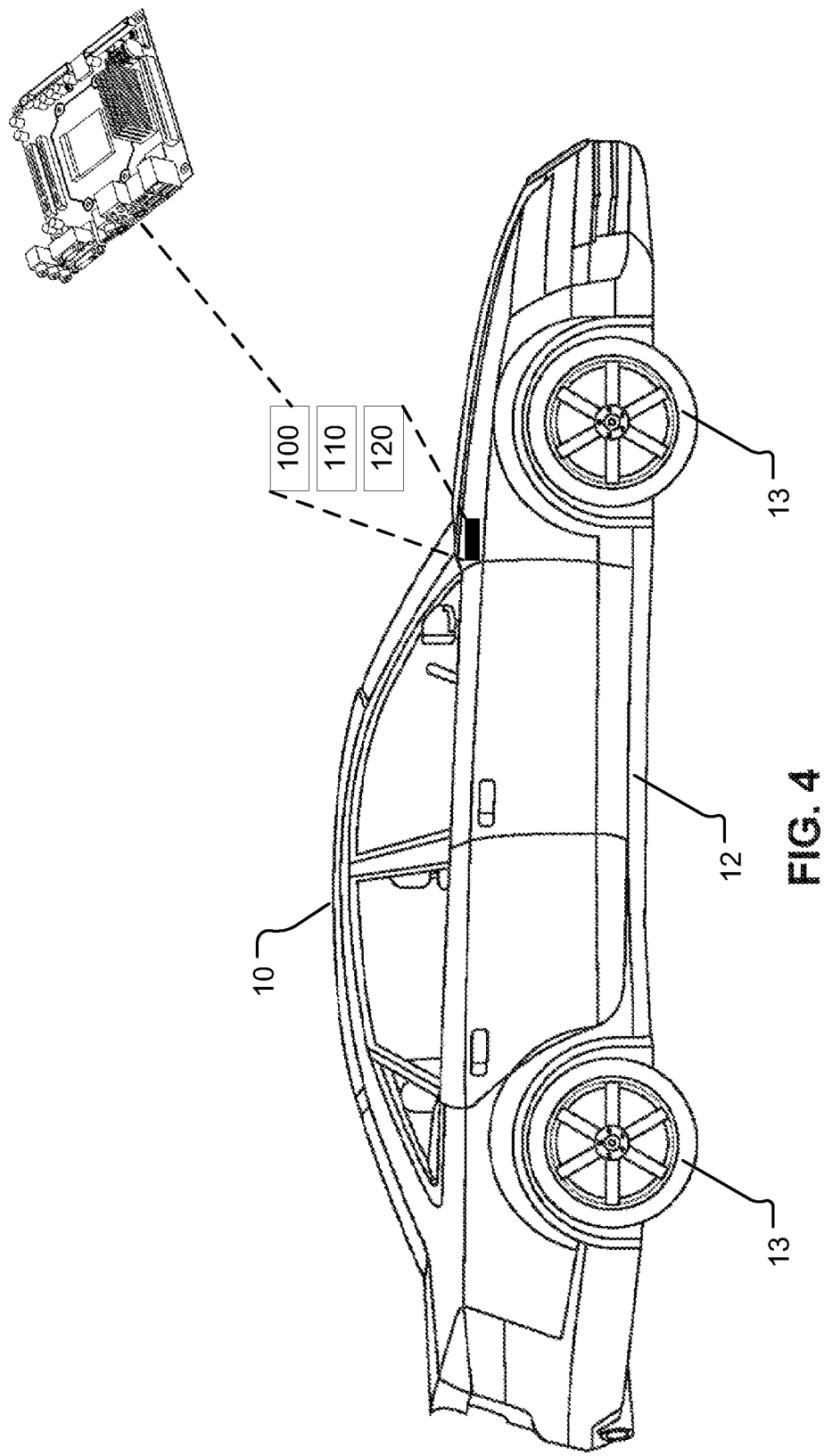
FIG. 4 is a right side view of the autonomous vehicle of FIG. 1.
Figure 5:
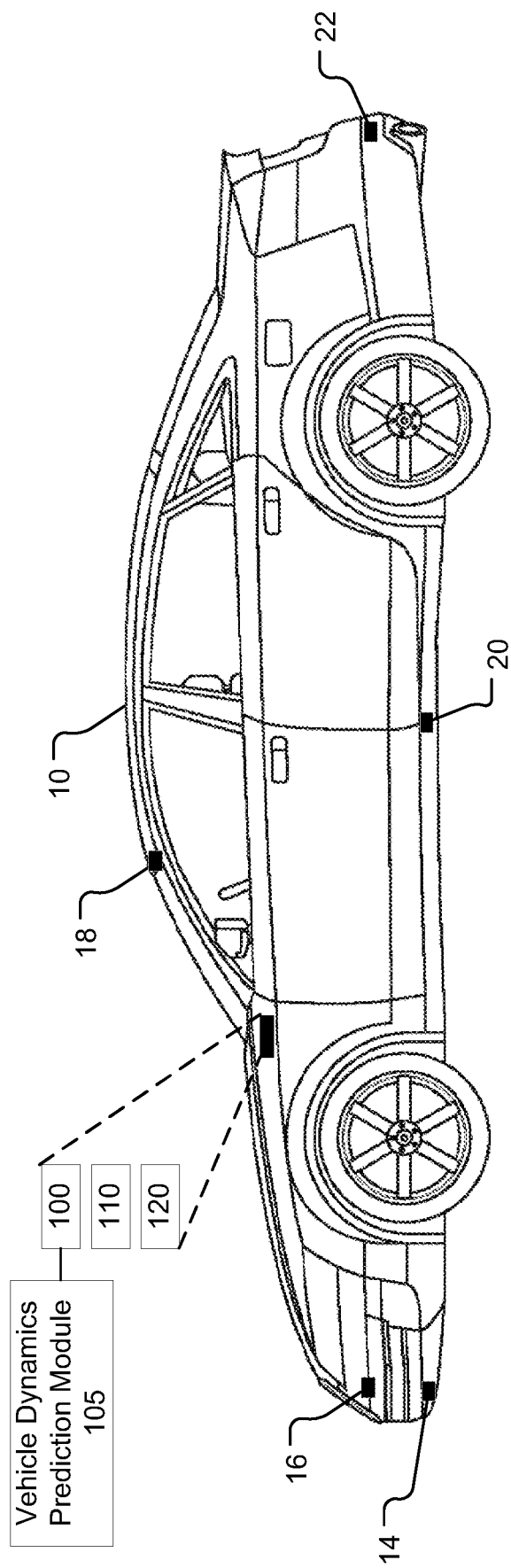
FIG. 5 is a left side view of the autonomous vehicle of FIG. 1.

Disclosed herein are various embodiments of a self-driving (autonomous) vehicle capable of automatically adjusting the steering geometry (e.g. toe angle or Ackerman angle) by predicting a vehicle dynamics condition so as to dynamically or pre-emptively adjust the steering geometry to improve vehicle dynamics. In some embodiments, the autonomous vehicle may predict a cornering force based on a curve of a roadway over which the vehicle is traveling using vehicle speed, location and a navigation map. In some embodiments, the vehicle pre-emptively adjusts the steering geometry (e.g. the toe angle) as the vehicle approaches a curve or corner to thereby improve cornering performance. The toe angle can also be readjusted for straightaways where the vehicle will be traveling at higher speeds in a straight line.

For the purposes of this specification, the terms "autonomous vehicle" (AV) or "self-driving vehicle" (SDV) are meant to encompass any land vehicle such as a car, van, minivan, sports utility vehicle (SUV), crossover-type vehicle, bus, minibus, truck, tractor-trailer, semi-trailer, construction vehicle, work vehicle, offroad vehicle, electric cart, or the like. The terms "autonomous vehicle" and "self-driving vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

FIGS. 1-5 depict a self-driving car 10 as one exemplary implementation of a self-driving vehicle or autonomous vehicle (AV). The self-driving vehicle or autonomous vehicle 10 includes, in the illustrated embodiment, a vehicle chassis 12 and a plurality of wheels 13, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric power plant. In a variant, the vehicle may have multiple electric motors for driving different wheels. In another variant, the motor may include a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle 10 may also be a mixed-mode human-drivable and self-drivable vehicle such as a self-driving car, truck, van, etc. that can be optionally driven directly by a human driver sitting in the driver's seat in which case the vehicle has two operating modes: (i) a conventional human driver mode with a human directly driving the vehicle using the steering wheel, brake pedal and accelerator as is conventionally done with non-autonomous vehicles; (ii) a self-driving (or autonomous) mode in which the vehicle's processor or computing system drives autonomously without direct human input, whether a human is seated in the driver's seat or not.

The autonomous vehicle 10 depicted by way of example in FIGS. 1-5 includes a plurality of sensors i.e. environment-detecting sensors for collision avoidance and following a road. The sensors may include RADAR, LIDAR, cameras and ultrasonic rangefinders. The autonomous (or self-driving) vehicle 10 further includes a self-driving processor, processors or computing device(s) configured to receive analog or digital signals (data) from the sensors and to generate steering, acceleration and braking control signals for controlling the steering system, the motor and the braking system of the vehicle. The autonomous driving processor may generate a steering control signal, an acceleration control signal and a braking control signal based on the signals received from the sensors. The autonomous driving processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

In the illustrated embodiment of FIGS. 1-5, the vehicle has a first sensor 14, a second sensor 16, a third sensor 18, and a fourth sensor 20. In the illustrated embodiment of FIGS. 1-5, the first, second, third and fourth sensors can be visible-spectrum cameras, infrared cameras and/or thermal imaging cameras. One or more of the sensors can be RADAR or LIDAR. Additional sensors may be provided on the vehicle 10, including additional cameras, additional LIDAR and RADAR sensors. The location of the sensors on the vehicle may be varied from what is shown in the figures. A different suite of sensors from what is illustrated may be used in other variants. These sensors are communicatively connected, either by wired or wireless channels, to the processor 100 for executing the autonomous driving functions based on the sensor input. The processor 100 may be coupled to a memory.

The autonomous (self-driving) vehicle 10 depicted by way of example in FIGS. 1-5 further includes a data transceiver 110, e.g. a cellular data transceiver, short-range wireless transceiver, a satellite transceiver or any other radiofrequency data transceiver. The data transceiver 110 may be any suitable wireless data transceiver for transmitting and receiving data wirelessly. In one main embodiment, the data transceiver is a cellular data transceiver (e.g. GSM, LTE, 5G or equivalent) that transmits data to a remote internet-connected server or servers whose functionality will be further described below.

The autonomous vehicle 10 depicted by way of example in FIGS. 1-5 further includes a Global Navigation Satellite System (GNSS) receiver 120 for receiving satellite signals and for determining a current location of the autonomous vehicle. The GNSS receiver 120 may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In the embodiment of the autonomous vehicle 10 depicted in FIGS. 1-5, the wheels 13 are rotationally mounted to the chassis 12. The front wheels are connected to, and steerable by, a steering mechanism controlled automatically by a steering geometry adjustment mechanism controlled by a processor executing a vehicle dynamics prediction module. The steering geometry of the steering mechanism is characterized by a toe angle and/or an Ackerman angle.

The toe angle of a wheel is the angle of the wheel with respect to a longitudinal axis of the vehicle as seen in a top plan view. In most instances, the left and right wheels have symmetrical toe angles, i.e. the wheels may have a common toe-in angle (wheels slightly converging in a forward direction), a common toe-out angle (wheels slightly diverging in a forward direction) or a neutral (zero) toe angle (wheels exactly parallel). As described below, in some embodiments, the left and right toe angles may be different in magnitude to provide an asymmetrical toe.

In the embodiment depicted in FIGS. 1-5, the vehicle 10 includes a vehicle dynamics prediction module 105 executing on a processor 100 for predicting a vehicle dynamics condition (e.g. a cornering force) and for generating a control signal based on the vehicle dynamics condition. The vehicle 10 includes a steering geometry adjustment mechanism connected to the steering mechanism for automatically adjusting the steering geometry in response to the control signal.

The vehicle dynamics prediction module 105 may be a software module executed by the processor 100 to compute expected forces, e.g. cornering forces, wind load, on the wheels based on sensor input. For example, the vehicle dynamics prediction module 105 may receive current location data from the GNSS 120 and receive a current vehicle speed from an onboard vehicle speed sensor from which the vehicle dynamics prediction module 105 can determine based on the autonomous vehicle's current routing whether the vehicle is about to encounter a turn, how sharp the turn is, and at what predicted speed the vehicle will take the turn. From the speed and radius of curvature of the turn, the vehicle dynamics prediction module 105 can calculate the expected cornering forces on each of the four wheels. The vehicle dynamics prediction module 105 can then determine an optimal, or at least a more effective, steering geometry. The more effective steering geometry may in various circumstances reduce the roll of the vehicle, the amount of tire wear, and/or the fuel/battery consumption and/or it may provide a more comfortable ride experience for the passengers. In one implementation, the vehicle dynamics prediction module 105 can further compute toe angles for rear wheels, i.e. for non-steerable wheels. For example, the vehicle dynamics prediction module 105 may be configured to automatically adjust the toe angle of the rear wheels and to independently automatically adjust the toe angle of the front wheels so that front and rear wheels have different toe angles.

Figure 6:
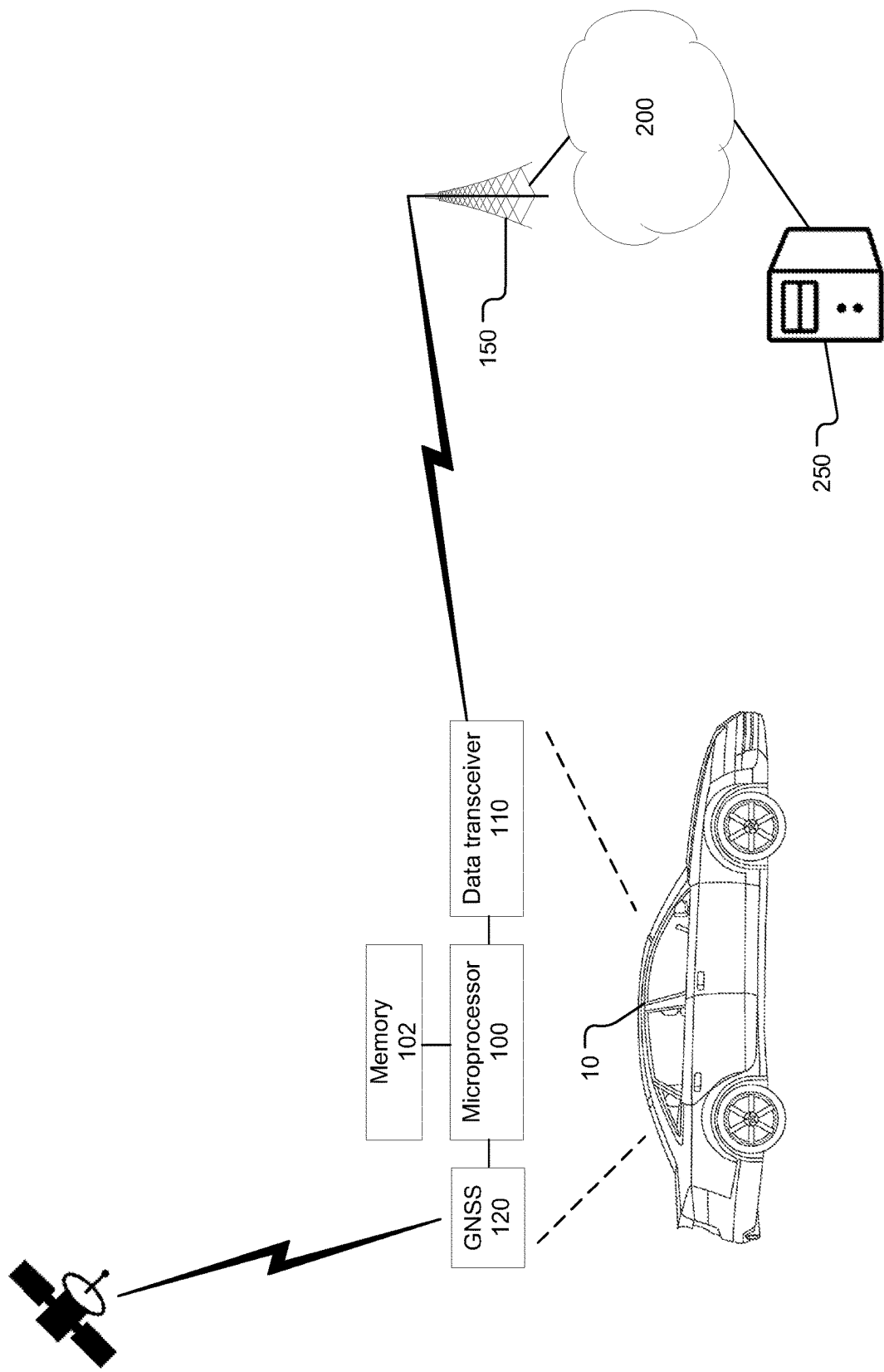
FIG. 6 illustrates a system including an autonomous vehicle connected wirelessly to a server for providing road data to the autonomous vehicle to enable the autonomous vehicle to pre-emptively adjust the steering geometry.

FIG. 6 depicts a system in which an autonomous vehicle 10 communicates with a remote network-connected server 250 to obtain or provide road and/or weather data such as road gradient and wind data. For example, the road data may be lateral road slope data (road gradient data) which is a measure of the slope or gradient of the road in a direction perpendicular to the direction of travel. Location-based wind data may also be retrieved from the server 250. The steering geometry for one or more of the wheels may be automatically adjusted by the vehicle dynamics prediction module 105 executed by the processor 100 while driving to compensate for the effects of the lateral road slope (gradient) and/or wind. The steering geometry may also be adjusted based on other factors. The wind, which may be characterized by wind speed and direction, may be used by to determine aerodynamically the wind load on the vehicle. For wind directions that are angled obliquely relative to the direction of travel, the wind load may cause the vehicle to veer or drift undesirably to one side. This wind-induced veering or drift may be corrected automatically by a steering geometry adjustment mechanism connected to the steering mechanism that automatically adjusts the steering geometry in response to a control signal generated by the processor 100 executing the vehicle dynamics prediction module 105. The steering geometry may also be adjusted for a particular camber and/or caster of the wheels as will be elaborated below.

The road gradient data and/or wind data may be obtained from the network-connected server 250 shown by way of example in FIG. 6 using the data transceiver 110 of the autonomous vehicle 10. The data transceiver 110 in this example is a cellular data transceiver configured to wirelessly communicate data from the vehicle 10 to the server 250 by attaching communicatively to a base transceiver station 150. Data is transmitted and received over a cellular wireless network using cellular communication protocols and standards for packet data transfer such as GSM, CDMA, GPRS, EDGE, UMTS, LTE, etc. The vehicle 10 may include a Subscriber Identity Module (SIM) card for GSM-type communications or a Re-Usable Identification Module (RUIM) card for CDMA-type communications. The packetized data transmitted to the base transceiver station 150 is then routed through the internet 200 to the server 250 which receives, processes, stores and distributes road gradient data or wind data to other vehicles.

In this particular example, the processor (or microprocessor) 100 of the autonomous vehicle 10 is communicatively coupled to a memory 102 for storing navigation data (e.g. a route), vehicle dynamics data (e.g. expected cornering forces), lateral road slope (gradient) data and/or wind data (e.g. received from the server) and wheel geometry data (e.g. caster angles and/or camber angles). The processor 100 cooperates with the data transceiver 110 to request and receive the lateral road slope data and/or wind data. In a variant, the autonomous vehicle can collect and transmit new lateral road slope data and/or wind data to the server. The lateral road slope data and/or wind data may be sent along with location coordinates from the GNSS receiver 120 so that the server 250 can store location-specific lateral road slope data and/or wind data. The location-tagged lateral road slope data and/or wind data may also be stored by the vehicle for its own use, e.g. when returning home over the same route or shared with other nearby vehicles. The road slope data and wind data may also be time-stamped in addition to being location-tagged. Wind data may thus be considered stale or expired after a predetermined time interval.

In the system depicted in FIG. 6, the autonomous vehicle 10 can connect, or remain persistently connected, to the server 250 for providing road data to the autonomous vehicle 10 to enable the autonomous vehicle 10 to pre-emptively adjust steering geometry and optionally also to adjust camber and/or caster angles. Pre-emptive adjustment means that the steering geometry adjustment is complete just prior to reaching the corner. In a variant, the vehicle can perform the adjustment while cornering.

Figure 7:
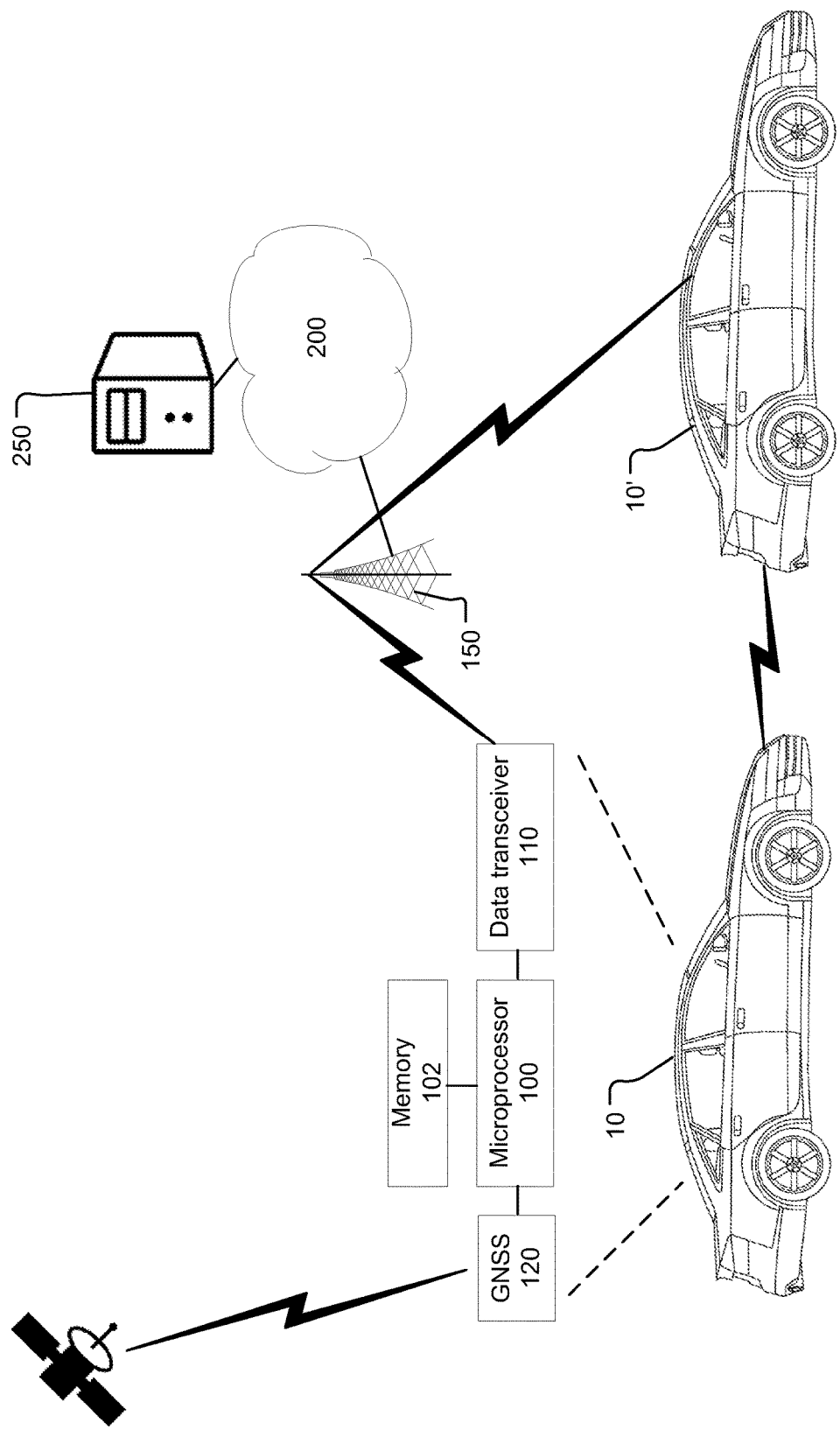
FIG. 7 illustrates a system including a first autonomous vehicle connected wirelessly to a second autonomous vehicle for providing road data from the first autonomous vehicle to the second autonomous vehicle to enable the second autonomous vehicle to pre-emptively adjust the steering geometry.

FIG. 7 illustrates a system including a first autonomous vehicle 10' connected wirelessly to a second autonomous vehicle 10 for providing road data from the first autonomous vehicle 10' to the second autonomous vehicle 10 to enable the second autonomous vehicle 10 to pre-emptively adjust the steering geometry. The road gradient and/or wind data may be shared via the server 250 or directly using a Vehicle-to-Vehicle (V2V) communication protocol. The vehicles 10, 10' may exchange V2V messages using IEEE 802.11p Dedicated Short-Range Communications (DSRC) in the 5.9 GHz band used, or to be used, by intelligent transportation systems (ITS). The DSRC messages are half duplex messages in the 5.850-5.925 GHz range and are short-range (approximately 300 m) and have a high data rate of 6-27 Mbps. The vehicles 10, 10' may also include a short-range data transceiver 110 such as a Wi-Fi® transceiver and/or a Bluetooth® transceiver for short-range data communication.

Figure 8:
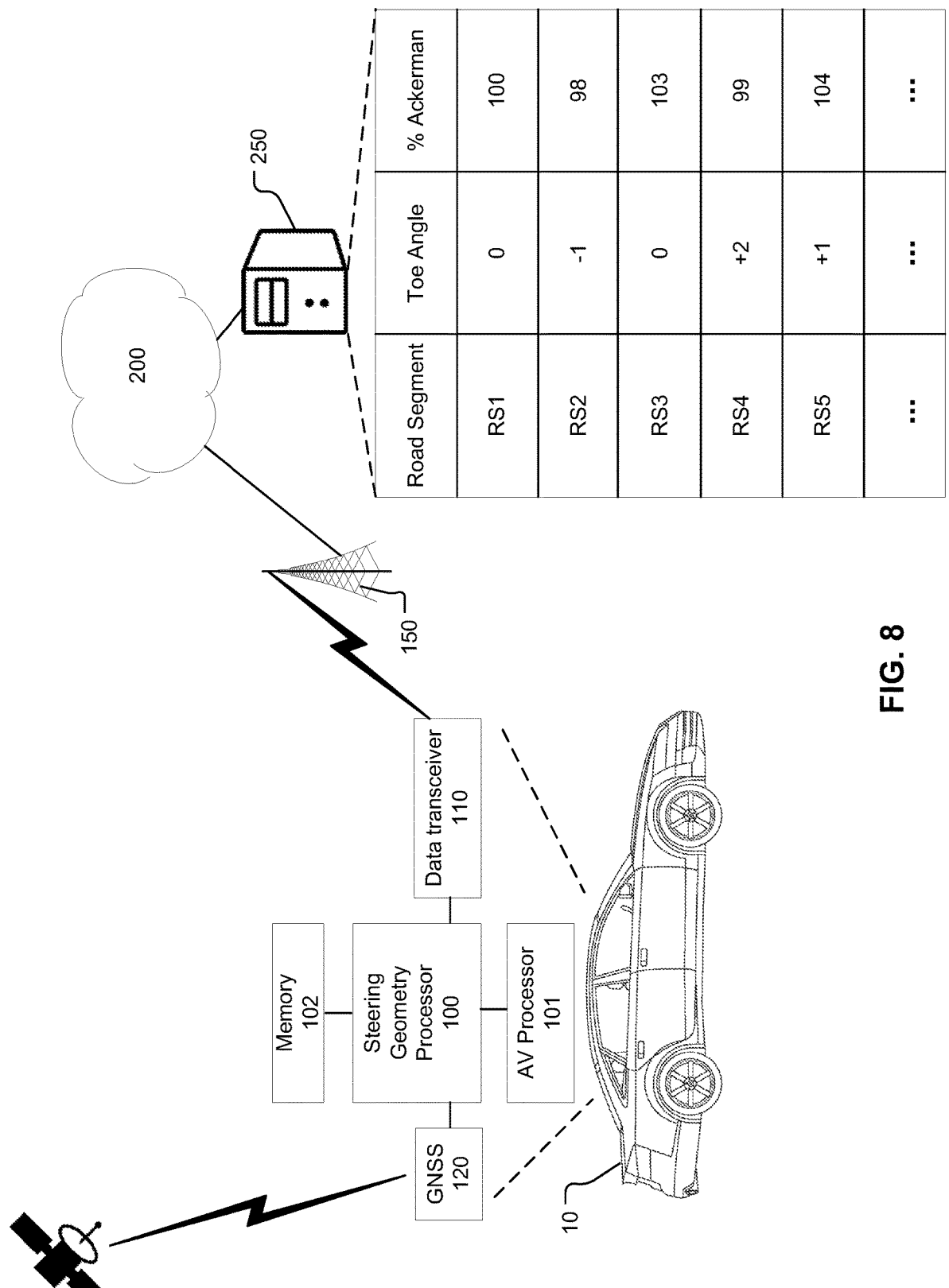
FIG. 8 illustrates a system in which the autonomous vehicle wirelessly receives pre-calculated toe angle and Ackerman data from a server to enable the autonomous vehicle to pre-emptively adjust the steering geometry.

FIG. 8 illustrates a system in which the autonomous vehicle 10 wirelessly receives recommended, pre-computed toe angles and Ackerman percentages from the server 250 (via the internet 200 and the base transceiver station 150) to enable the autonomous vehicle 10 to pre-emptively adjust the toe and/or Ackerman percentage. The Ackerman percentage represents how much the inner wheel turns compared to the outer wheel when turning. A 100% Ackerman condition occurs when the turning circles of both the inner and outer wheels are concentric while 0% would indicate that both circles are the same i.e. the inner wheel turns the same angle as that of the outer wheel.

The pre-computed (pre-calculated) data is stored at the server 250 and served to the autonomous vehicle 10 for a plurality of road segments as shown by way of example in FIG. 8. In the example shown in FIG. 8, the autonomous vehicle 10 has a discrete steering geometry processor 100 and a separate autonomous driving processor 101. Alternatively, the steering geometry processor and autonomous driving processor may be combined into a single processor as shown for example in FIGS. 6 and 7.

Figure 9:
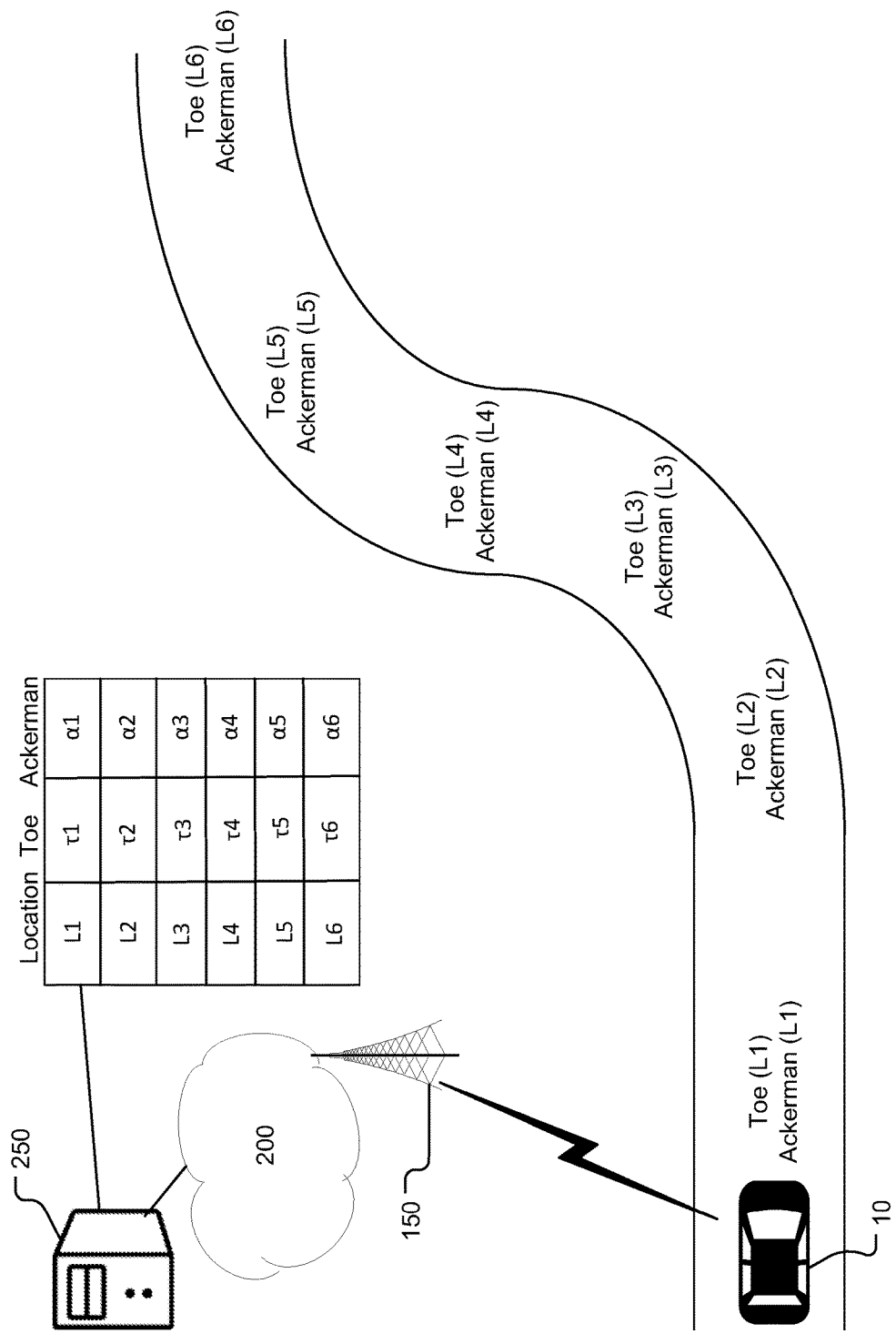
FIG. 9 is a schematic depiction of an autonomous vehicle obtaining road curvature data from a server to determine vehicle dynamics conditions at each turn to thereby enable the autonomous vehicle to pre-emptively control steering geometry for each turn.

FIG. 9 is a schematic depiction of the autonomous vehicle 10 in wireless communication with the server 250 via the internet 200 and the base transceiver station 150. The vehicle 10 transmits a request to the server for recommended toe angles and/or Ackerman angles to be used to adjust the steering geometry for each of the upcoming curves of the road over which the vehicle 10 is traveling. In one embodiment, the vehicle 10 sends its projected speed at each curve to enable the server to determine an improved steering geometry for the vehicle 10. The steering geometry may be sent back to the vehicle in response to the request. In another embodiment, the vehicle dynamics prediction module 105 onboard the vehicle 10 determines the steering geometry and transmits the steering geometry (e.g. toe angles and Ackerman angles) to the server 250 to enable the server 250 to share this steering geometry data with other vehicles. In another embodiment, the server executes a learning algorithm that uses data from a multiplicity of vehicles to refine the predictive model used by the vehicle dynamics prediction module 105. In this embodiment, the server 250 may share software updates with the vehicle dynamics prediction module 105 to provide the vehicle dynamics prediction module 105 with the latest, most refined predictive model.

Whether the autonomous vehicle has a discrete steering geometry processor or a combined steering geometry and autonomous driving processor, the processor 100 is configured to execute a vehicle dynamics prediction module 105 to predict forces on the wheels (i.e. the vehicle dynamics condition) and to output a control signal based on the vehicle dynamics condition. One control signal per wheel may be output in some embodiments. The control signal is used to control a steering geometry or, in some embodiments, to control each wheel's toe angle individually. In addition, the processor may optionally be configured to also automatically adjust one or both of the camber angle and the caster angle of the respective wheel in response to the control signal using a wheel geometry adjustment mechanism that may comprise in one embodiment both a camber adjustment actuator and a caster adjustment actuator. In another embodiment, the wheel geometry adjustment mechanism has only a camber adjustment actuator. In another embodiment, the wheel geometry adjustment mechanism has only a caster adjustment actuator.

In a four-wheeled vehicle, the plurality of wheels thus comprises a front left wheel, a front right wheel, a rear left wheel and a rear right wheel. In one embodiment, the vehicle dynamics prediction module 105 generates a first control signal for a first toe angle for the front left wheel, generates a second control signal for a second toe angle for a front right wheel, generates a third control signal for a third toe angle for a rear left wheel, and generates a fourth control signal for a fourth toe angle for a rear right wheel.

Figure 10:
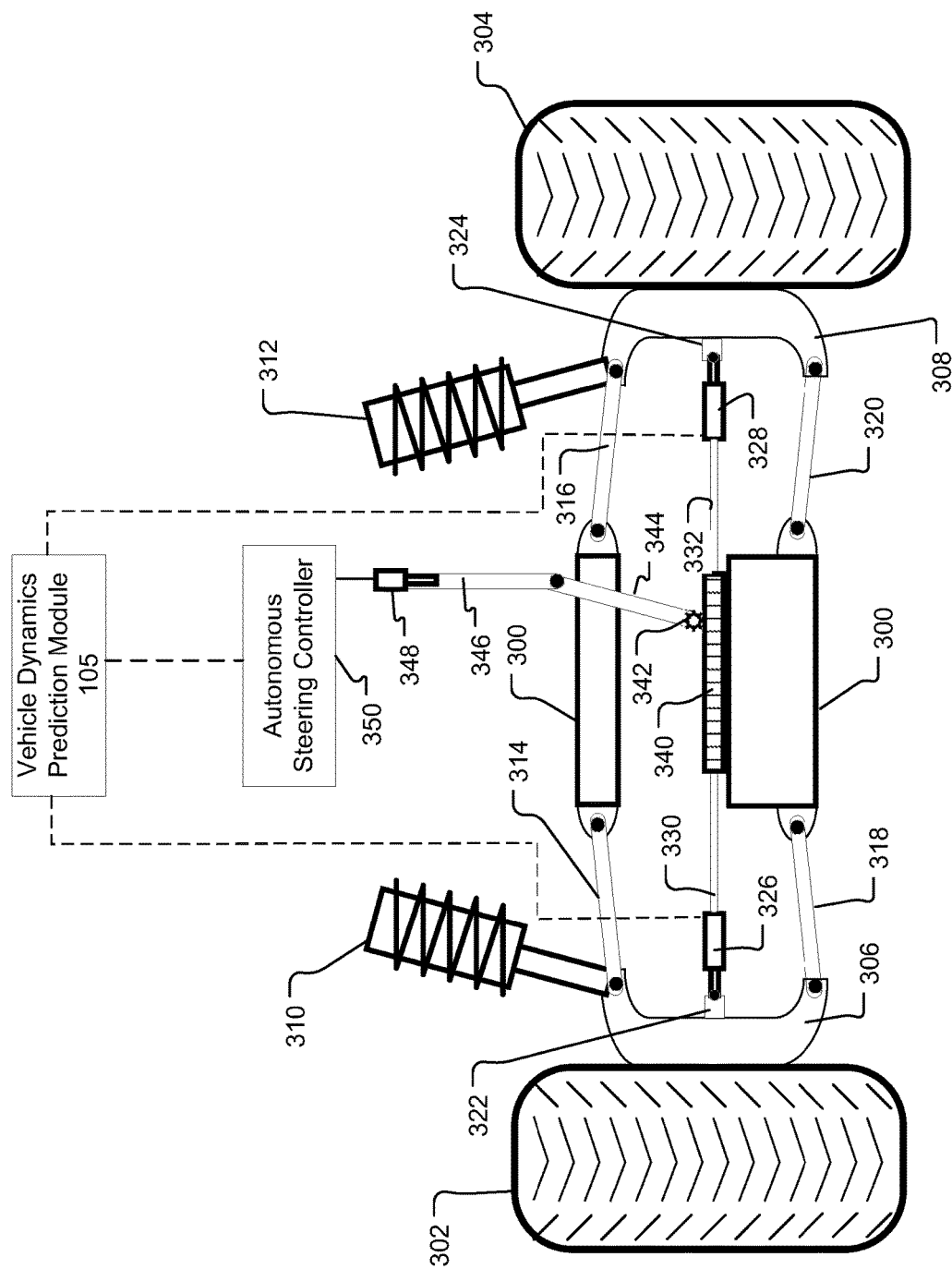
FIG. 10 depicts a vehicle steering mechanism having an autonomous steering controller configured to automatically adjust the toe angles of the steerable wheels.

FIG. 10 depicts a steering and suspension system of an autonomous vehicle 10. The steering and suspension system includes a steering mechanism and a suspension system. As depicted by way of example in FIG. 10, left and right steerable wheels 302, 304 are rotationally mounted to a chassis 300 of the autonomous vehicle 10. Each wheel is characterized by a toe angle. The left and right steerable wheels 302, 304 are steered by the steering mechanism. In the embodiment of FIG. 10, the left and right wheels 302, 304 are connected to respective left and right steering knuckles 306, 308 (also known as the uprights). The left knuckle 306 is connected via upper control arm 314 and lower control arm 318 to the chassis 300. The right knuckle is connected via upper control arm 316 and lower control arm 320 to the chassis 300. Left and right shock-and-spring assemblies 310, 312 are connected between the chassis or other part of the vehicle frame and to the knuckles or to the upper or lower control arms. The left steering knuckle 306 has a left knuckle lever arm 322 that connects to a left toe adjustment actuator 326 which in turn connects to a left tie rod 330. The left tie rod 330 connects to a rack-and-pinion steering mechanism that includes a rack 340 and a pinion 342. Symmetrically, the right steering knuckle 308 has a right knuckle lever arm 324 that connects to a right toe adjustment actuator 328 which in turn connects to a right tie rod 332. The right tie rod 330 connects to the rack-and-pinion steering mechanism that includes the rack 340 and the pinion 342.

As shown schematically in FIG. 10, the pinion 342 is connected to a first steering linkage 344 which is connected to a second steering linkage 346 which is connected in turn to a steering actuator 348. The steering actuator is driven by an autonomous steering controller 350. During autonomous driving, the autonomous steering controller receives steering signals from a vehicle processor to autonomously steer the vehicle by operating the rack-and-pinion steering mechanism. The vehicle dynamics prediction module 105 outputs a control signal to the autonomous steering controller 350 to adjust the steering geometry of the steering mechanism of the autonomous vehicle based on predicted vehicle dynamics. The steering geometry of the steering mechanism may be adjusted automatically by automatically adjusting the toe angle of the wheels 302, 304 either together or individually.

In the embodiment depicted in FIG. 10, the steering mechanism includes the left and right steering knuckles 306, 308, the left and right knuckle lever arms 322, 324, the left and right tie rods 330, 332, and the rack-and-pinion steering mechanism that includes the rack 340 and the pinion 342. The steering mechanism further includes the first and second steering linkages 344, 346 and the steering actuator 348.

In the embodiment depicted in FIG. 10, the steering geometry adjustment mechanism includes the adjustment actuators, i.e. the left toe adjustment actuator 326 and the right toe adjustment actuator 328.

In one embodiment, the vehicle dynamics prediction module 105 predicts a vehicle dynamics condition and generates multiple control signals based on the vehicle dynamics condition. The control signals are sent to the autonomous steering controller 350. In one specific embodiment, the first control signal enables adjustment of the steering geometry while a second control signal enables a camber adjustment actuator associated with each wheel 302, 304 to automatically adjust the camber angle in response to the second control signal. Optionally, a third control signal enables a caster adjustment actuator to automatically adjust the caster angle in response to the third control signal.

The steering geometry and wheel geometry adjustment mechanisms may be adapted to the front steerable wheels and/or to the non-steerable rear wheels, whether these are drive wheels or not. The mechanisms may thus be used with front-wheel drive, rear-wheel, all-wheel drive or four-wheel drive vehicles. Although the above description refers to a typical road vehicle with four wheels, it will be appreciated that the inventive concepts may be adapted to vehicles with more than four wheels, e.g. to six-wheeled vehicles or eight-wheeled vehicles.

The steering mechanism may be a rack-and-pinion steering mechanism or another type of steering mechanism such as a parallelogram steering mechanism.

In one embodiment, the vehicle dynamics prediction module 105 receives and applies a user-specified drive mode from a plurality of user-selectable drive modes. The drive mode may be used by the vehicle dynamics prediction module 105 to further modify the steering geometry. For example, a sport mode may be used by the vehicle dynamics prediction module 105 to change the steering geometry for more aggressive cornering. An economy ("eco") mode may be used by the vehicle dynamics prediction module 105 to position the wheels at zero toe for better fuel efficiency or battery range.

In another embodiment, the autonomous vehicle 10 may have a master selector to switch between an automatic adjustment mode and a manual adjustment mode. In the automatic adjustment mode, the vehicle dynamics prediction module 105 automatically adjusts the steering geometry as described above. In the manual adjustment mode, the user can select the steering geometry (e.g. the toe angle). The autonomous vehicle 10 in the manual adjustment mode displays on a vehicle display (e.g. dashboard display) an adjustment interface element that is user-selectable to receive user input (driver input) to adjust the toe angle. The dashboard display may also graphically or pictorially show a representation of the autonomous vehicle and its wheels with the toe angle so the user (driver) can see how much toe is applied to the wheels while sitting inside the vehicle. Likewise, when operating in the automatic adjustment mode, the vehicle dynamics prediction module 105 may be configured to output a display signal to the vehicle display to display information, thereby showing the driver how the steering geometry is changing while cornering. In a variant, the vehicle display may present an enlarged view of the front wheels and/or a slow-motion animation of the changing toe angle. The toe angle may include a numerical value indicating the angle in degrees and an indication of whether the wheels are toe-in or toe-out or neutral toe. The toe angle may include a graphical or pictorial representation of the wheels showing the toe angle. The vehicle display may enable the user to rotate and/or zoom the graphical or pictorial representation to view the wheel and tire and/or the vehicle from different perspectives and/or different scales or zoom levels. The adjustment interface element may be a virtual touch screen button or group of buttons, or plus (+) and minus (−) buttons, a rotatable knob, or any other suitable input device.

Figure 11:
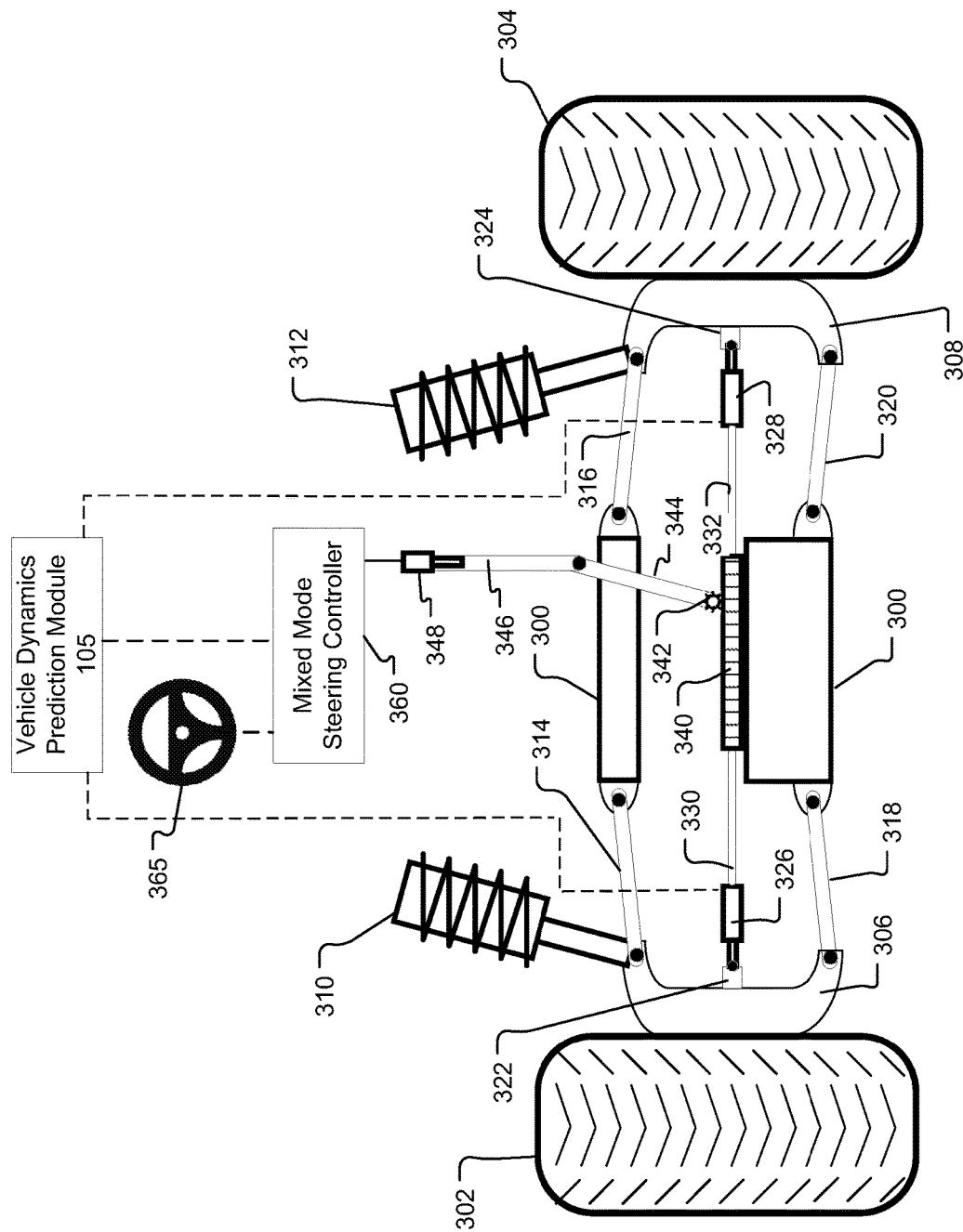
FIG. 11 depicts a vehicle steering mechanism having a mixed mode steering controller configured to automatically adjust the toe angles of the steerable wheels.

FIG. 11 depicts a vehicle steering mechanism similar to the one depicted in FIG. 10 but having a mixed mode steering controller 360 configured to automatically adjust the toe angles of the steerable wheels 302, 304. The mixed mode steering controller receives primary input either from a steering wheel 365 (when a human is steering the vehicle) or from a processor or other controller that autonomously steers the vehicle.

Figure 12:
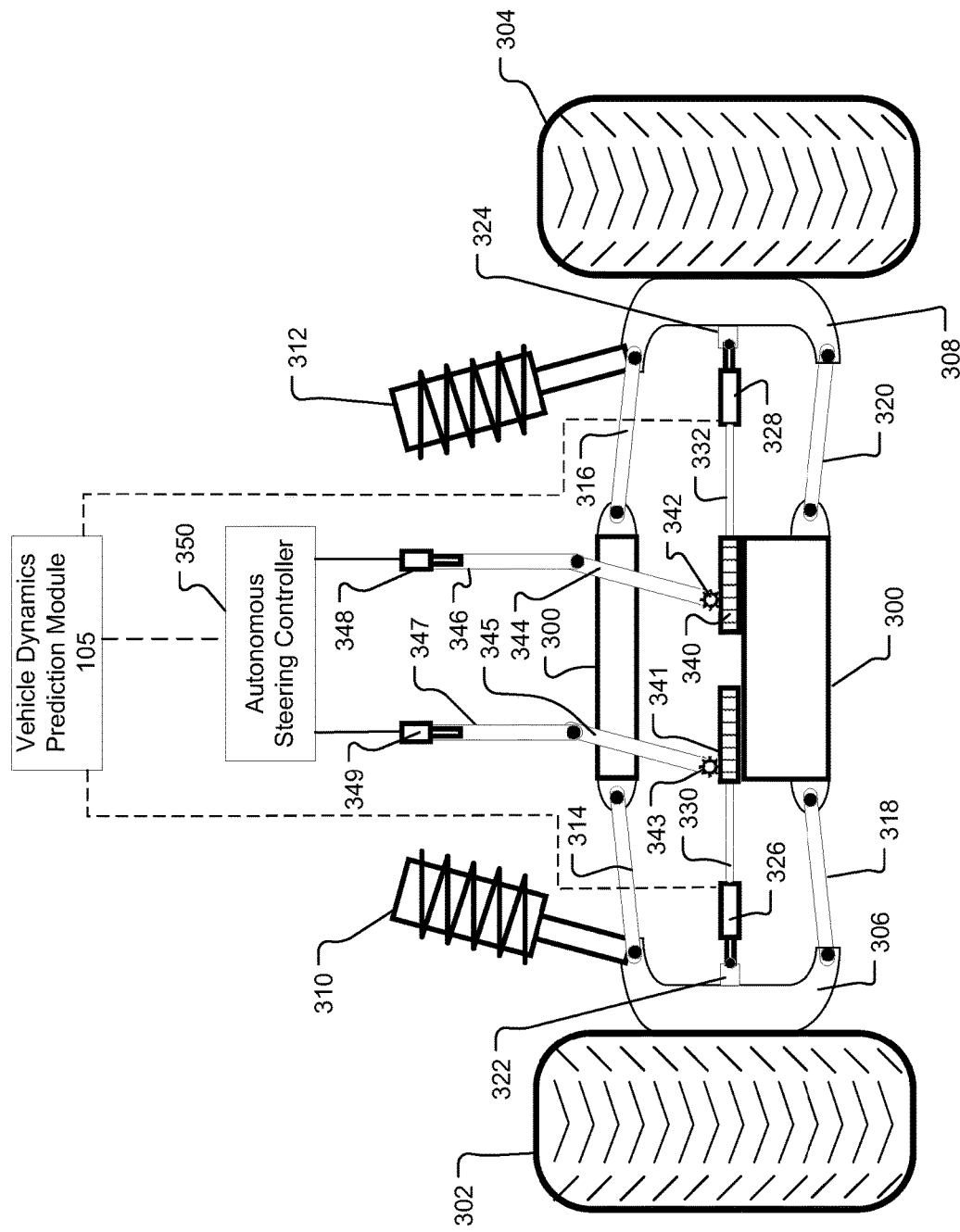
FIG. 12 depicts a vehicle having two independent rack and pinion steering mechanisms and an autonomous steering controller configured to automatically adjust the toe angles of the steerable wheels via the two independent rack and pinion steering mechanisms.

FIG. 12 depicts a vehicle having two independent rack-and-pinion steering mechanisms 340, 341 and an autonomous steering controller 350 configured to automatically adjust the toe angles of the steerable wheels 302, 304 via the two independent rack-and-pinion steering mechanisms 340, 341. Automatic adjustments of the toe angle of the wheels 302, 304 (i.e. adjusting the steering geometry) may be accomplished by the left and right toe adjustment actuators 326, 328. Thus, in the embodiment of FIG. 12, the toe angles may be adjusted individually. Furthermore, the independent rack-and-pinion steering mechanisms enable the wheels 302, 304 to be mechanically decoupled and steered independently of each other.

Figure 13:
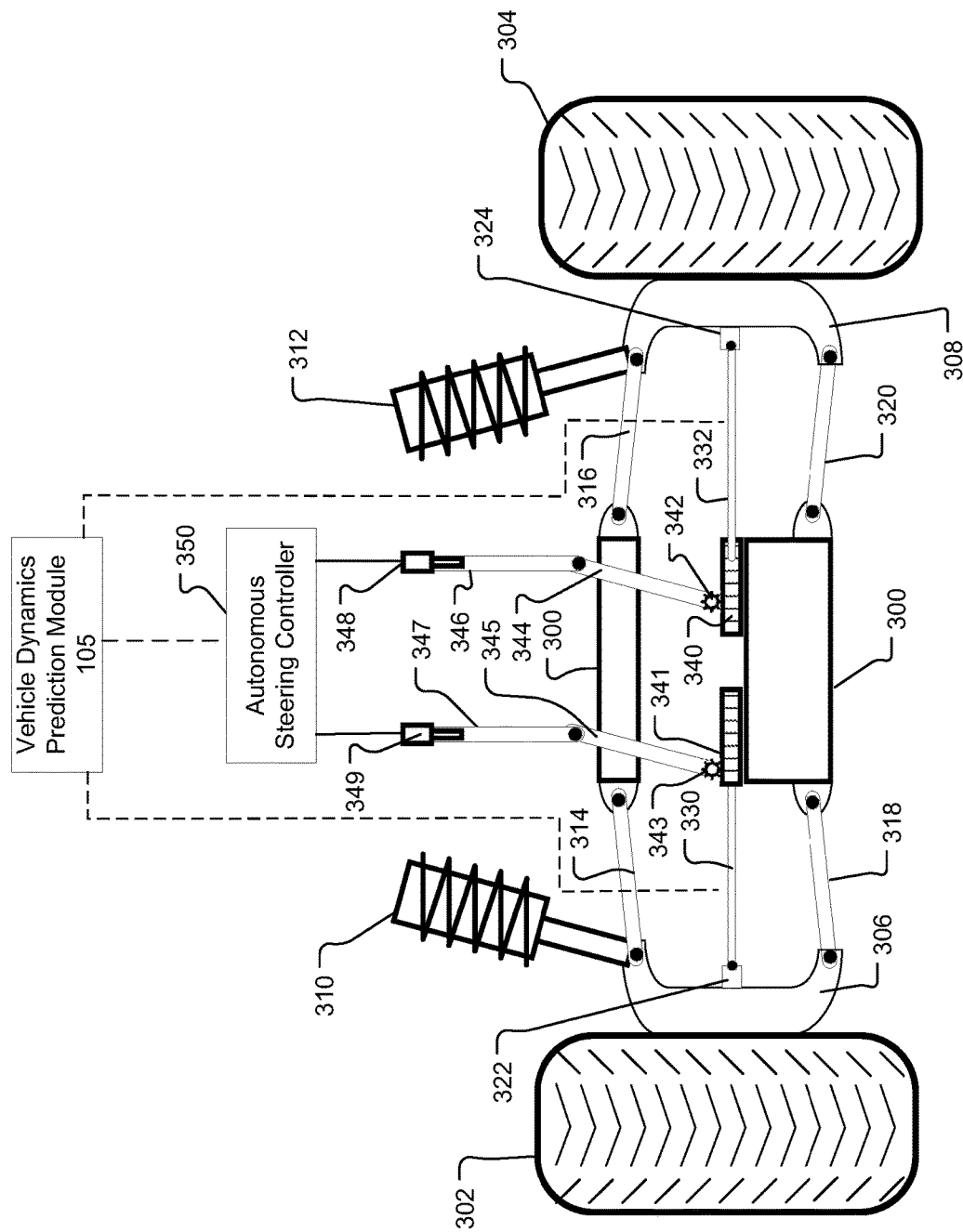
FIG. 13 depicts a vehicle having two independent rack and pinion steering mechanisms and an autonomous steering controller configured to independently steer the steerable wheels via the two independent rack and pinion steering mechanisms.

FIG. 13 depicts a vehicle having two independent rack-and-pinion steering mechanisms and an autonomous steering controller 350 configured to independently steer the steerable wheels via the two independent rack-and-pinion steering mechanisms. In this embodiment, there are no left and right toe adjustment actuators. The vehicle may be steered by dynamically and individually varying the toe angle of each of the steerable wheels 302, 304.

Figure 14:
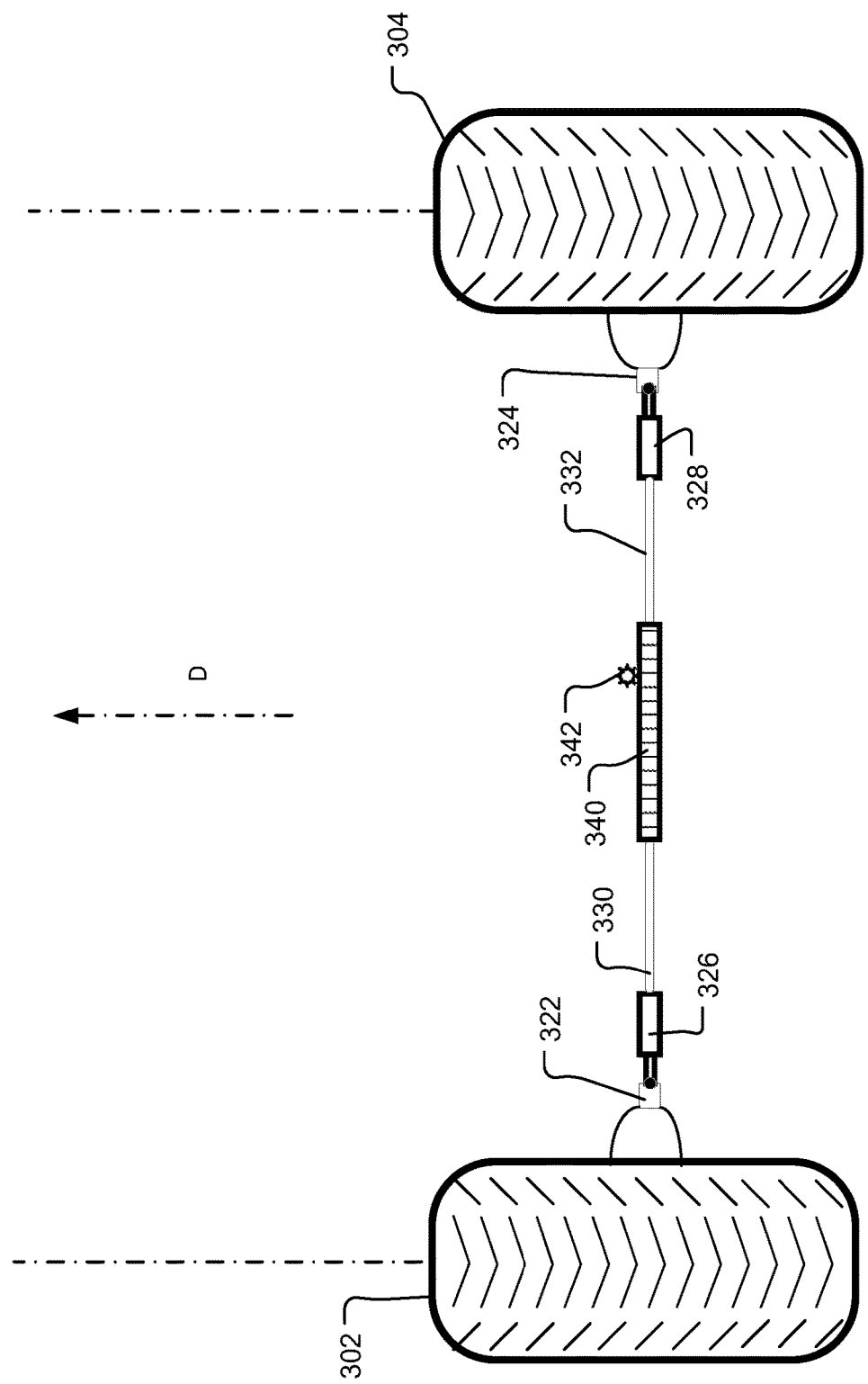
FIG. 14 depicts a top view of the steerable wheels and steering mechanism of FIG. 10.

FIG. 14 depicts a top view of the steerable wheels 302, 304 and the steering mechanism of FIG. 10. The steering mechanism includes, as noted above, the rack 340 and pinion 342, the tie rods 330, 332 and the knuckle lever arms 322, 324. The toe adjustment actuators 326, 328 enable adjustment of the toe angles of the wheels. The wheels in this figure are set at neutral toe (a toe angle of zero) as the wheels are parallel to the direction of travel D, i.e. the plane of rotation of the wheels is parallel to the direction of travel.

Figure 15:
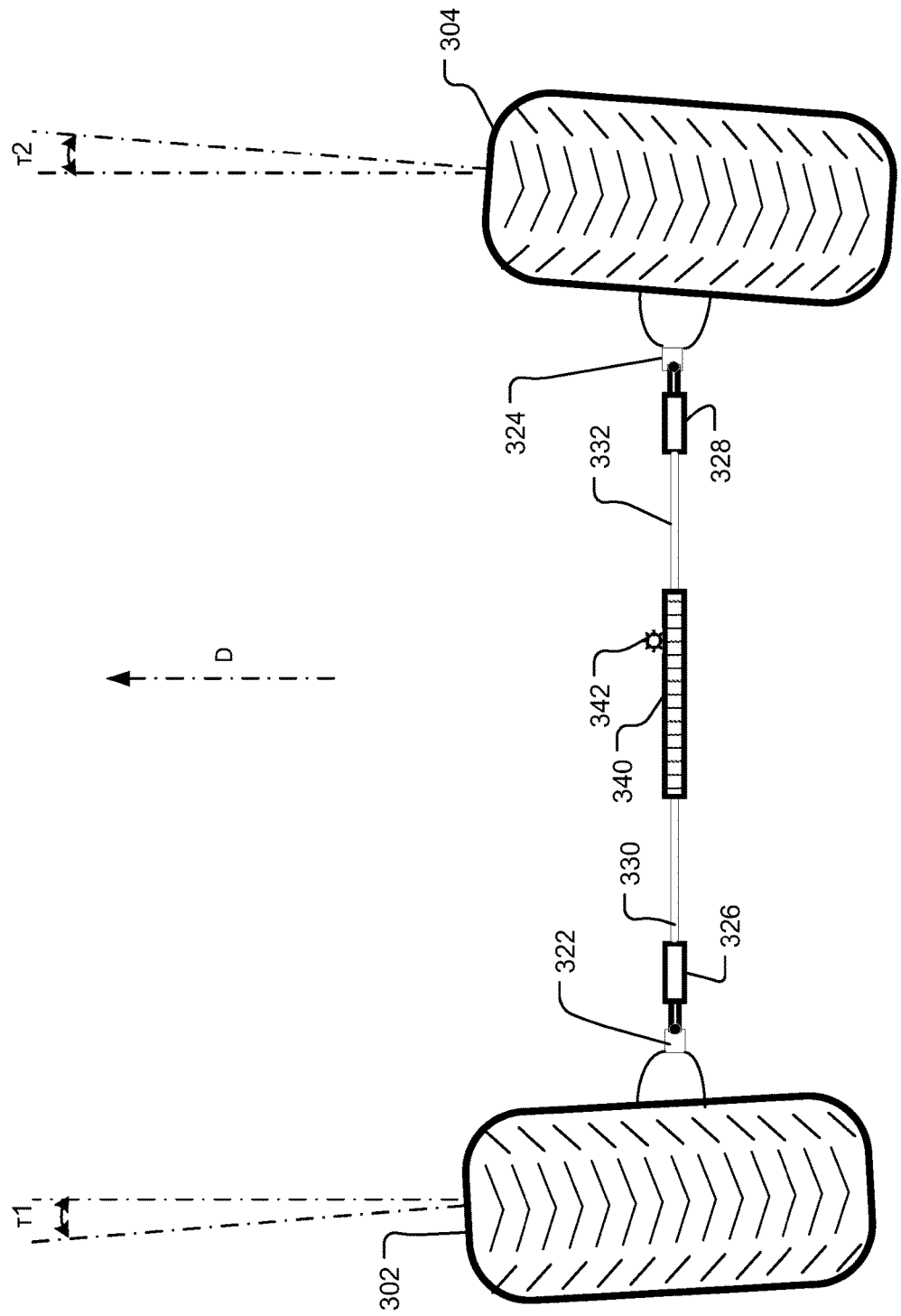
FIG. 15 depicts the wheels and steering mechanism of FIG. 14 in a toe-out configuration.

FIG. 15 depicts the wheels 302, 304 and the steering mechanism of FIG. 14 in a toe-out configuration. In the toe-out configuration, the left wheel has a toe angle $\pi 1$ while the right wheel has a right toe angle $\pi 2$. In this example, the left and right toe angles are equal in magnitude, thus providing a symmetrical toe-out configuration.

Figure 16:
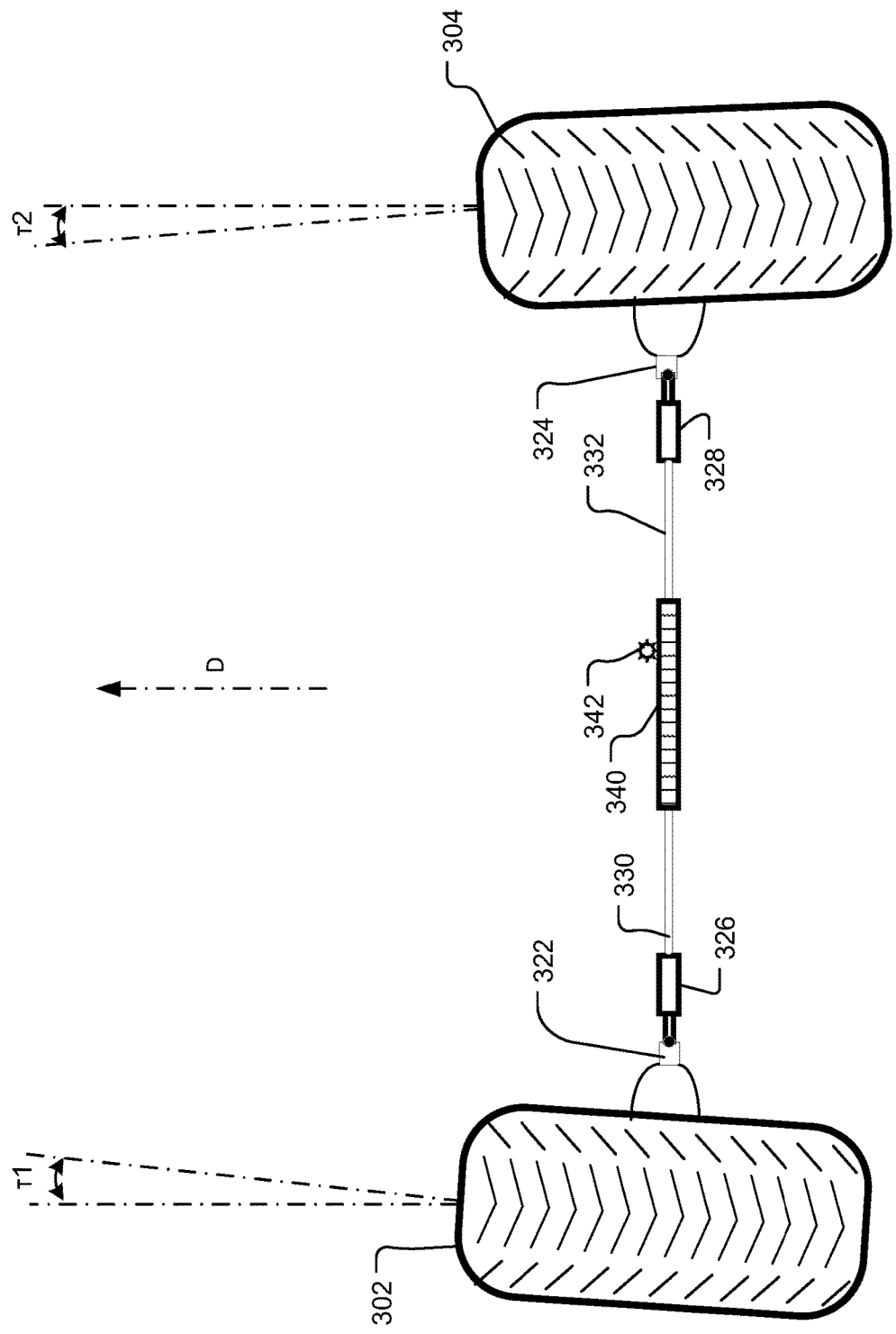
FIG. 16 depicts the wheels and steering mechanism of FIG. 14 in a toe-in configuration.

FIG. 16 depicts the wheels and steering mechanism of FIG. 14 in a toe-in configuration. In the toe-in configuration, the left wheel has a toe angle $\pi 1$ while the right wheel has a right toe angle $\pi 2$. In this example, the left and right toe angles are equal in magnitude, thus providing a symmetrical toe-in configuration.

Figure 17:
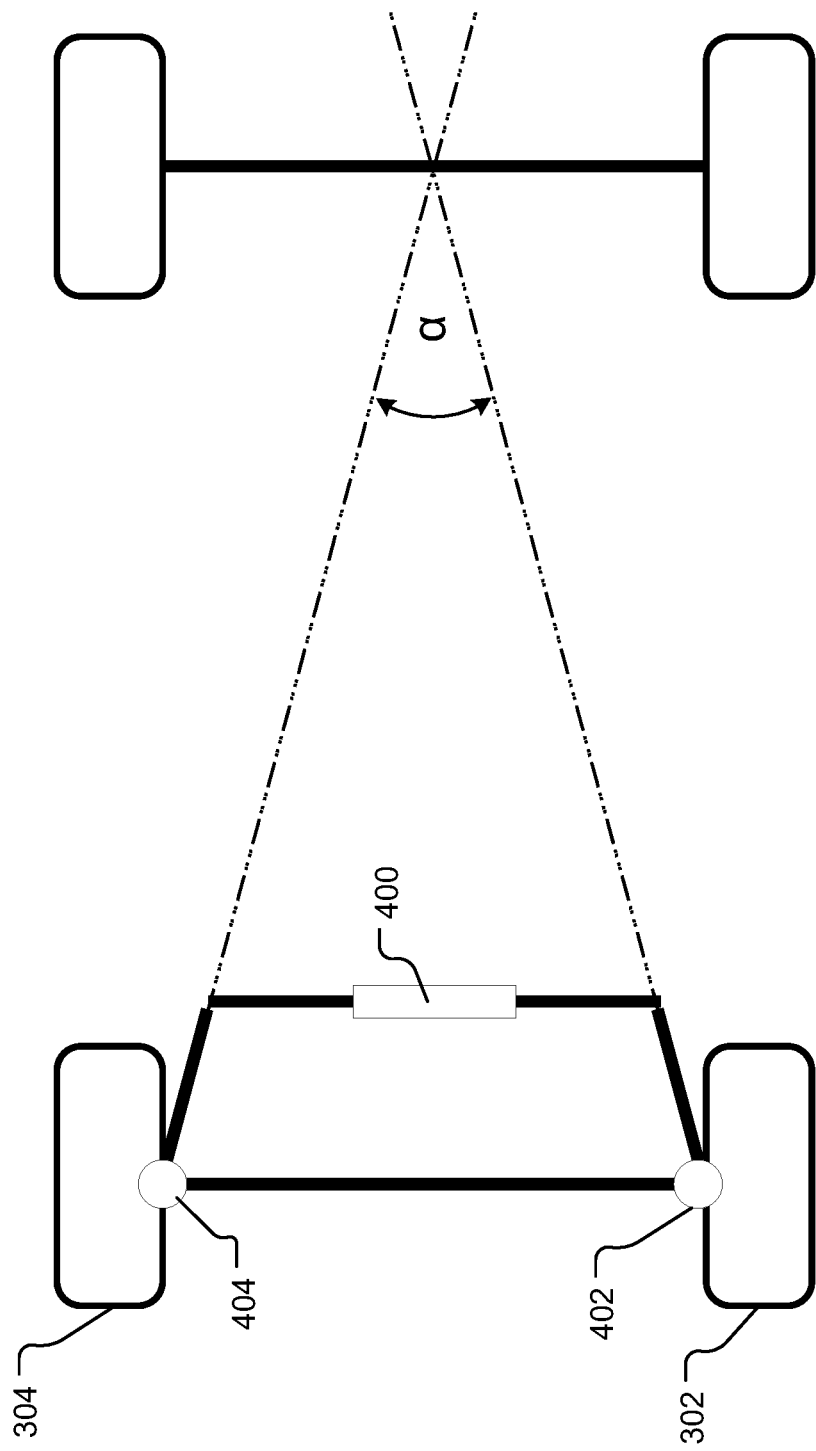
FIG. 17 is a top schematic view of a steering mechanism having an Ackerman-adjusting linear actuator and toe-adjusting rotary actuators.

FIG. 17 is a top schematic view of a steering mechanism having an Ackerman-adjusting linear actuator 400 and toe-adjusting rotary actuators 402, 404. In the configuration depicted in FIG. 17, the Ackerman angle ($\alpha$) is defined by the steering geometry of the steering mechanism as shown in the figure. In a true (or pure) Ackerman steering geometry, the steering arms are angled such that projecting lines intersect with the center line of the rear axle as shown in FIG. 17. With the true Ackerman steering geometry, there is no dynamic toe angle change on the inside wheel.

Figure 18:
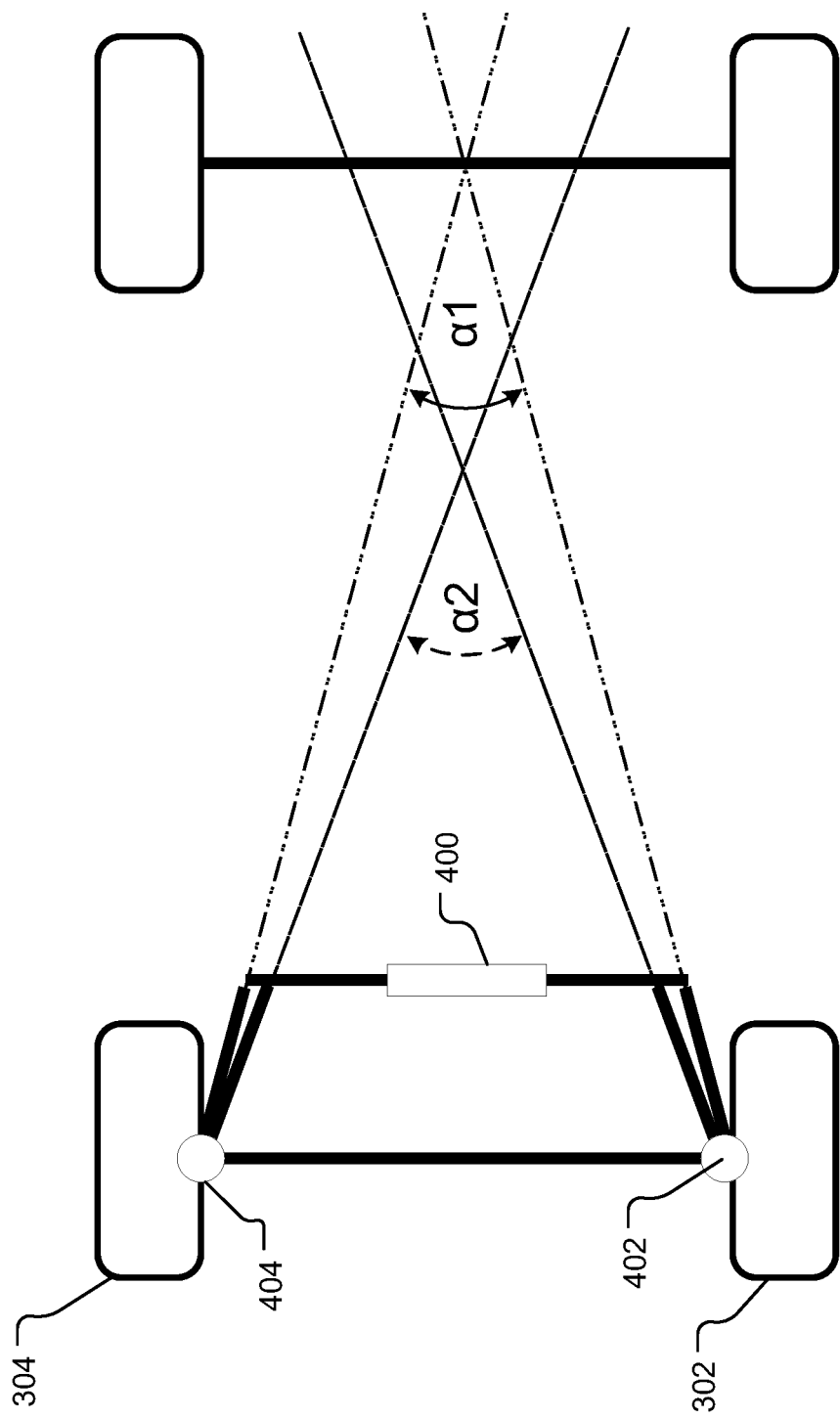
FIG. 18 is a top schematic view of a steering mechanism adjusting (e.g. reducing) its Ackerman angle using the actuators of FIG. 17.

FIG. 18 is a top schematic view of a steering mechanism that is processor-controlled to automatically adjust (e.g. reduce) its Ackerman angle (from $\alpha 1$ to $\alpha 2$) using the actuators 400, 402, 404 of FIG. 17. The linear actuator 400 retracts to shorten the transverse linkage. In so doing, the wheels will toe outwardly. If the resulting toe is not desired, the rotary actuators 402, 404 are provided to optionally readjust the toe angle of the left and right wheels 302, 304. The linear and rotary actuators may be operated sequentially or simultaneously to effect the adjustment. These may be, for example, lockable hydraulic or pneumatic actuators or electric motors or servos.

Figure 19:
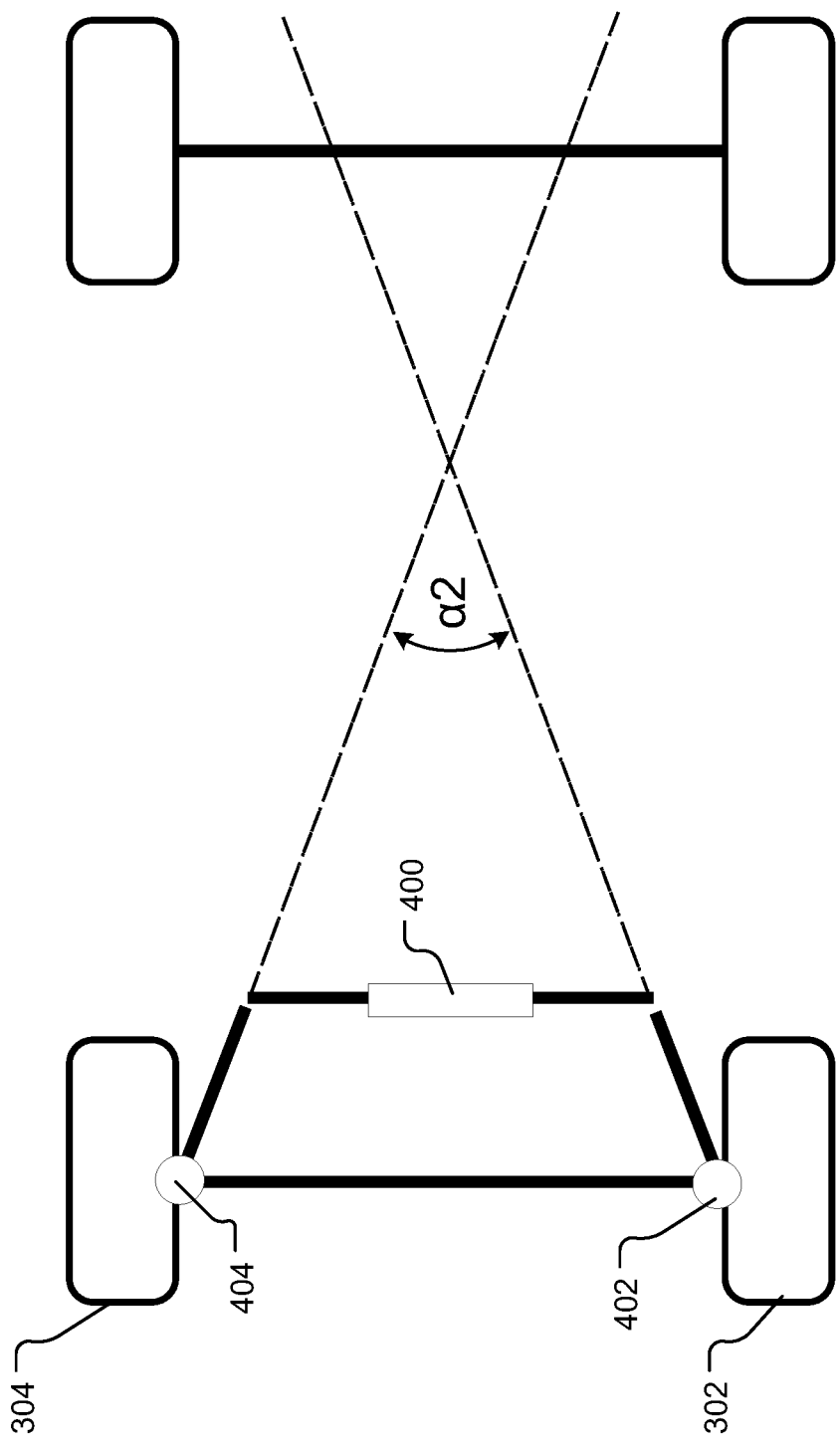
FIG. 19 is a top schematic view of a steering mechanism after adjustment of the Ackerman angle.

FIG. 19 is a top schematic view of the steering mechanism after adjustment of the Ackerman angle from $\alpha 1$ to $\alpha 2$ using the actuators 400, 402, 404 as described above. More Ackermann is achieved by angling the steering arms more sharply towards each other such that projections of the steering arms intersect forward of the center line of the rear axle. This steering geometry creates toe out on the front inner wheel. Again, the toe may be adjusted by the rotary actuators 402, 404.

Figure 20:
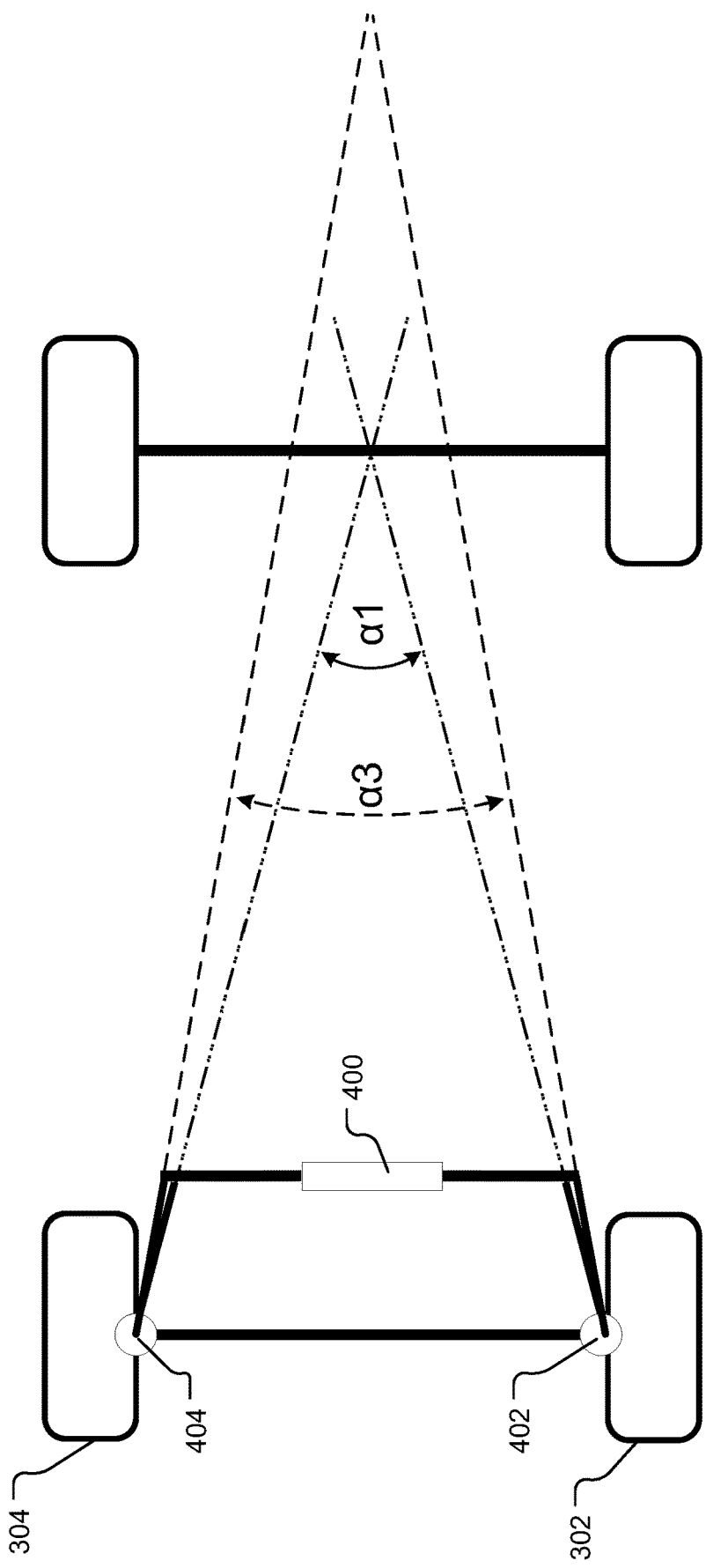
FIG. 20 is a top schematic view of a steering mechanism adjusting (e.g. increasing) its Ackerman angle.

FIG. 20 is a top schematic view of a steering mechanism adjusting (e.g. increasing) its Ackerman angle. To diminish the Ackerman angle, the steering arms converge more shallowly such that projections of the steering arms intersect behind the center line of the rear axle. This is also known as reverse Ackerman geometry. This is useful to compensate for significant differences in slip angle between the inner and outer front wheels while cornering especially at high speed. The use of reverse Ackerman geometry helps reduce tire temperatures during high-speed cornering but degrades manoeuverability at low speeds.

FIG. 21 schematically depicts a vehicle with its front wheels 302, 304 in a toe-out configuration. The steering geometry adjustment mechanism can adjust the toe angle based on a control signal from the vehicle dynamics prediction module. The steering geometry adjustment mechanism can adjust the toe to change the vehicle's cornering performance. Increased toe-in will usually reduce oversteer, will stabilize the vehicle and will enhance high-speed stability. Increased toe-out will usually reduce understeer, especially when initially entering a corner. Generally, toe-out improves steering responsiveness or cornering responsiveness. Depending on the vehicle dynamics condition that is predicted, the steering geometry can be automatically and pre-emptively adjusted to optimize or improve cornering. Alternatively, the adjustment of the steering geometry may be made dynamically while cornering as opposed to before cornering.

FIG. 22 schematically depicts a vehicle with its front wheels 302, 304 in a toe-in configuration. Toe-in provides improved straight-line stability at the expensive of cornering responsiveness. For example, in one implementation, if the vehicle dynamics prediction module 105 predicts a long straightaway with no corners, the steering geometry adjustment mechanism adjusts the wheels to have toe-in. However, if the vehicle dynamics prediction module 105 predicts large centrifugal forces due to an upcoming corner, the steering geometry adjustment mechanism adjusts the wheels to have toe-out.

Figure 23:
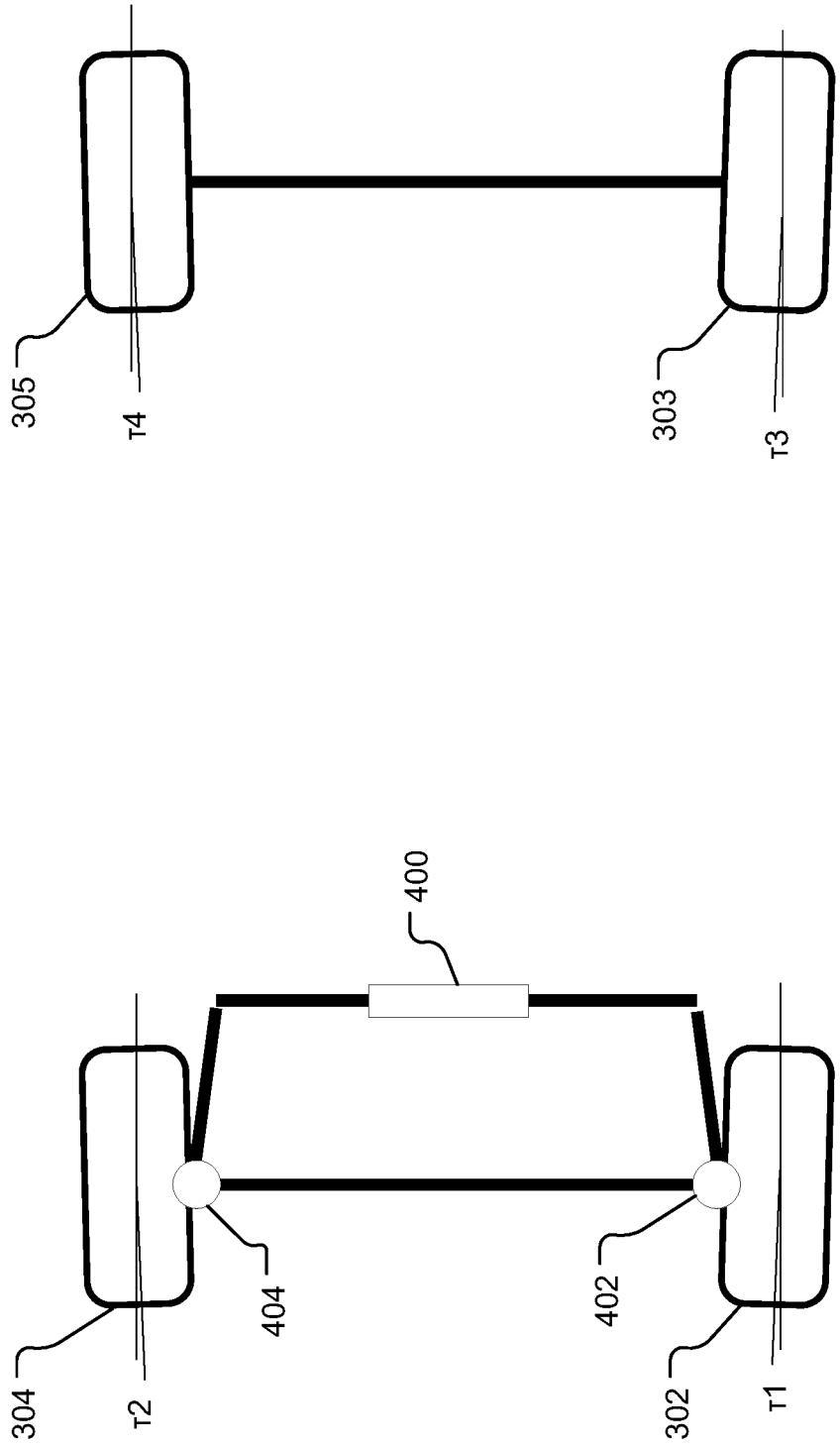
FIG. 23 schematically depicts a vehicle with both its front and rear wheels in a toe-in configuration.

FIG. 23 schematically depicts a vehicle with both its front wheels 302, 304 and its rear wheels 303, 305 in a toe-in configuration. Toe-in on the rear wheels 303, 305 can be utilized to create an understeer effect to compensate for vehicles that tend to oversteer, e.g. on exiting a corner. Toe-in however generates wear and heat in the rear tires. Thus, the processor 100 can dynamically adjust the rear wheel toe to toe-in to compensate for oversteer when cornering and then readjust the rear wheel toe to neutral when traveling straight paths to minimize tire wear.

Figure 24:
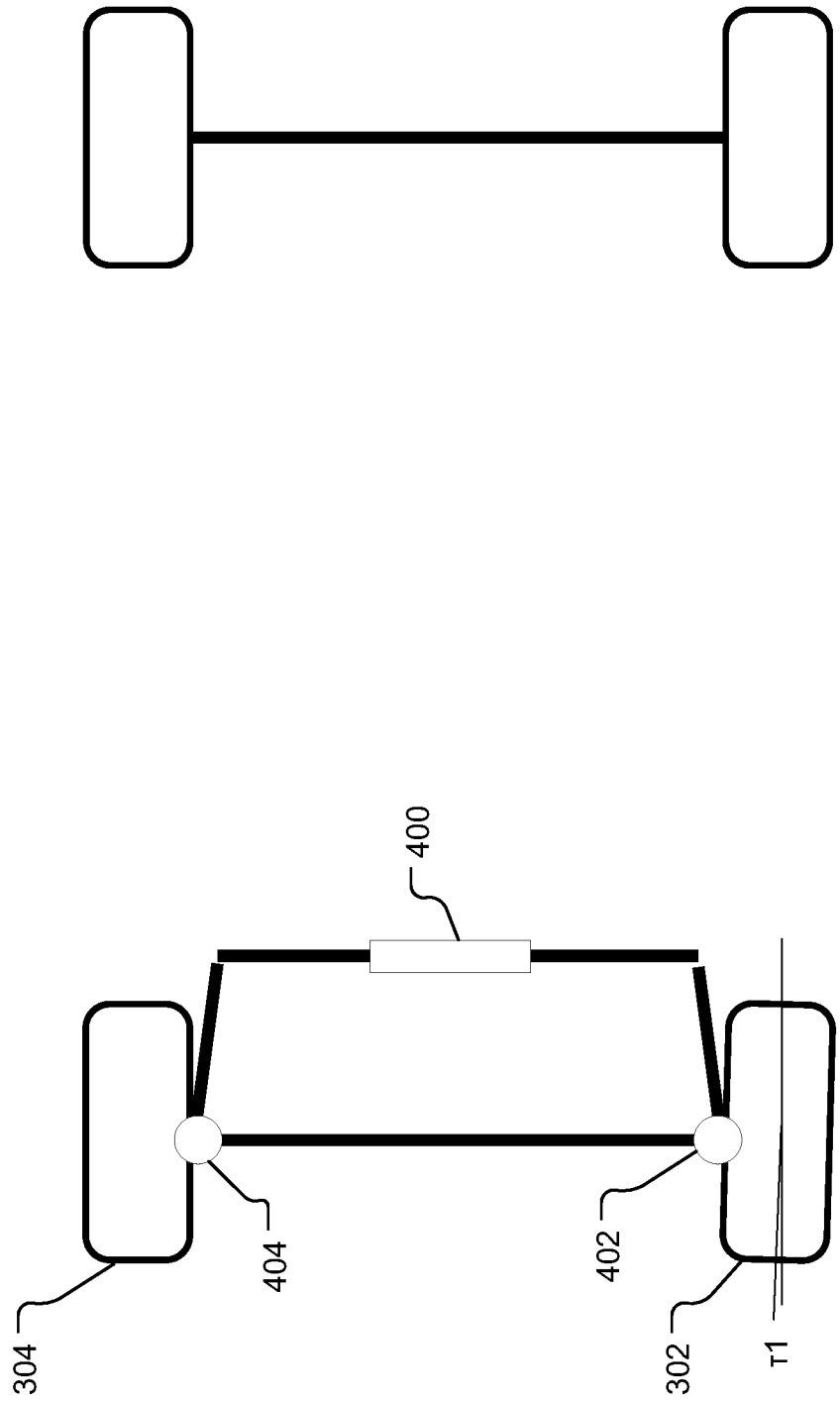
FIG. 24 schematically depicts a vehicle with its left front wheel in a toe-in configuration while its right front wheel is toe neutral.

FIG. 24 schematically depicts a vehicle with its left front wheel 302 in a toe-in configuration while its right front wheel 304 is toe neutral. This asymmetric toe configuration can be accomplished using the steering geometry adjustment mechanism by virtue of the mechanism's independent toe adjustment actuators (i.e. left and right toe adjustment actuators). For example, the left actuator can set a left toe angle and the right actuator can set a right toe angle that is different from the left toe angle. In this particular example, the right toe actuator sets the right wheel to have neutral (zero) toe.

Figure 25:
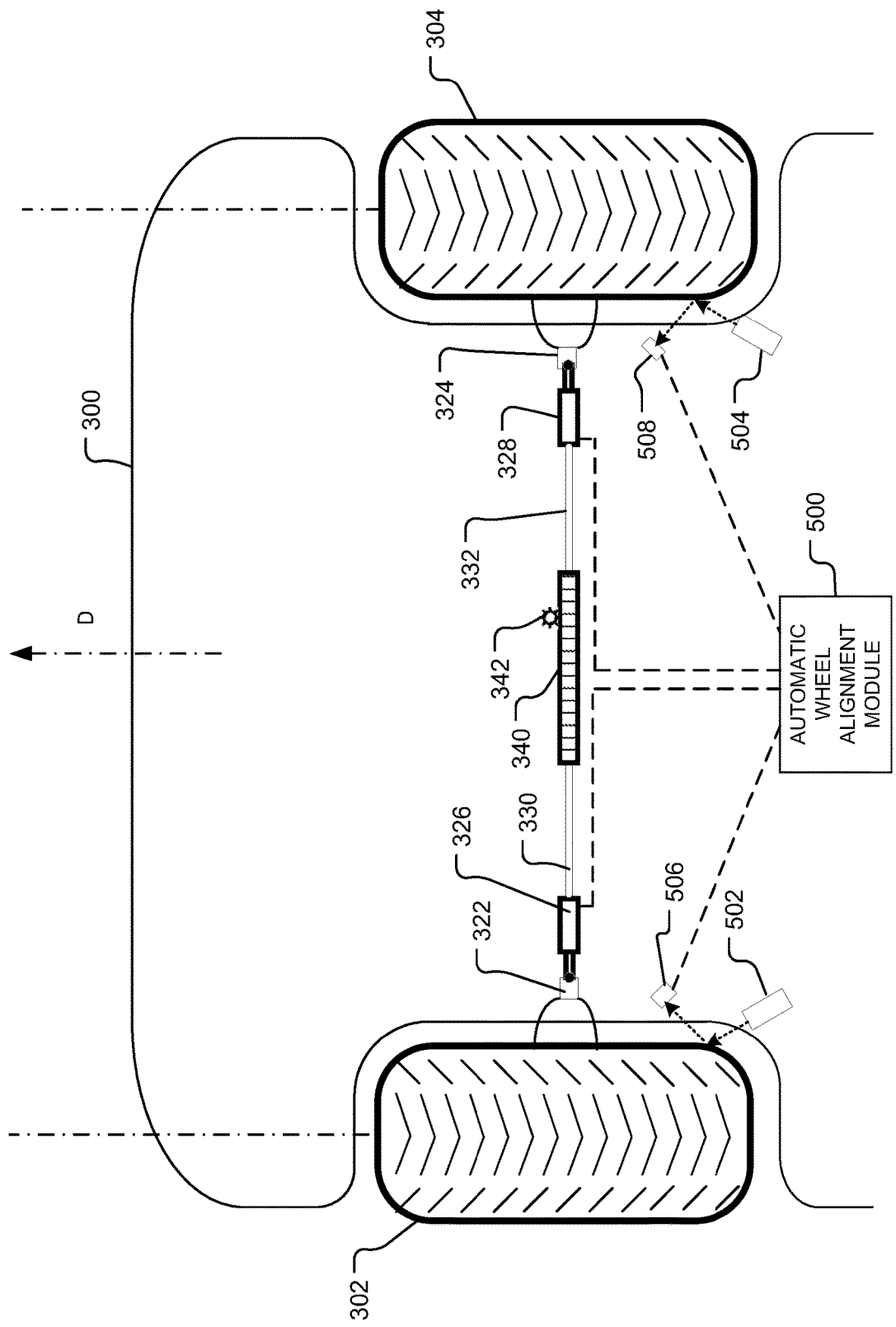
FIG. 25 depicts a steering mechanism with an automatic wheel alignment module.

In another aspect of this disclosure, FIG. 25 depicts a wheel-realigning steering mechanism with an automatic wheel alignment module. In the illustrated embodiment, the automatic wheel alignment module 500 automatically aligns or realigns the left and right wheels 302, 304. The alignment or realignment may be performed automatically by the vehicle while driving or parked. Misalignment may occur due to a pothole, hitting a curb or obstacle, etc. The wheel-realigning steering mechanism includes wheel alignment sensors to detect wheel alignment and to provide signals to the automatic wheel alignment module 500. In the illustrated embodiment, the wheel alignment sensors include a left emitter 502 and a left receiver 506 as well as a right emitter 504 and a right receiver 508. For example, the emitters and receivers may be optical devices such as a light-emitting and light-receiving devices, e.g. infrared emitters and infrared detectors. The measured angle indicates the alignment angle of the wheel. The automatic wheel alignment module 500 receives the measured angles from the receivers 506, 508 and then compares the measured angles with the preset wheel alignment angles. If a discrepancy is detected, the automatic wheel alignment module 500 outputs a control signal to cause a toe-adjusting actuator to adjust the toe of the wheel, thereby realigning the wheel. In one implementation, the vehicle continually, intermittently or periodically senses the alignment of the wheels to determine if realignment is required. If realignment is required, the vehicle automatically performs the realignment. In one implementation, the realignment is displayed graphically on a display screen inside the cabin of the vehicle.

Figure 26:
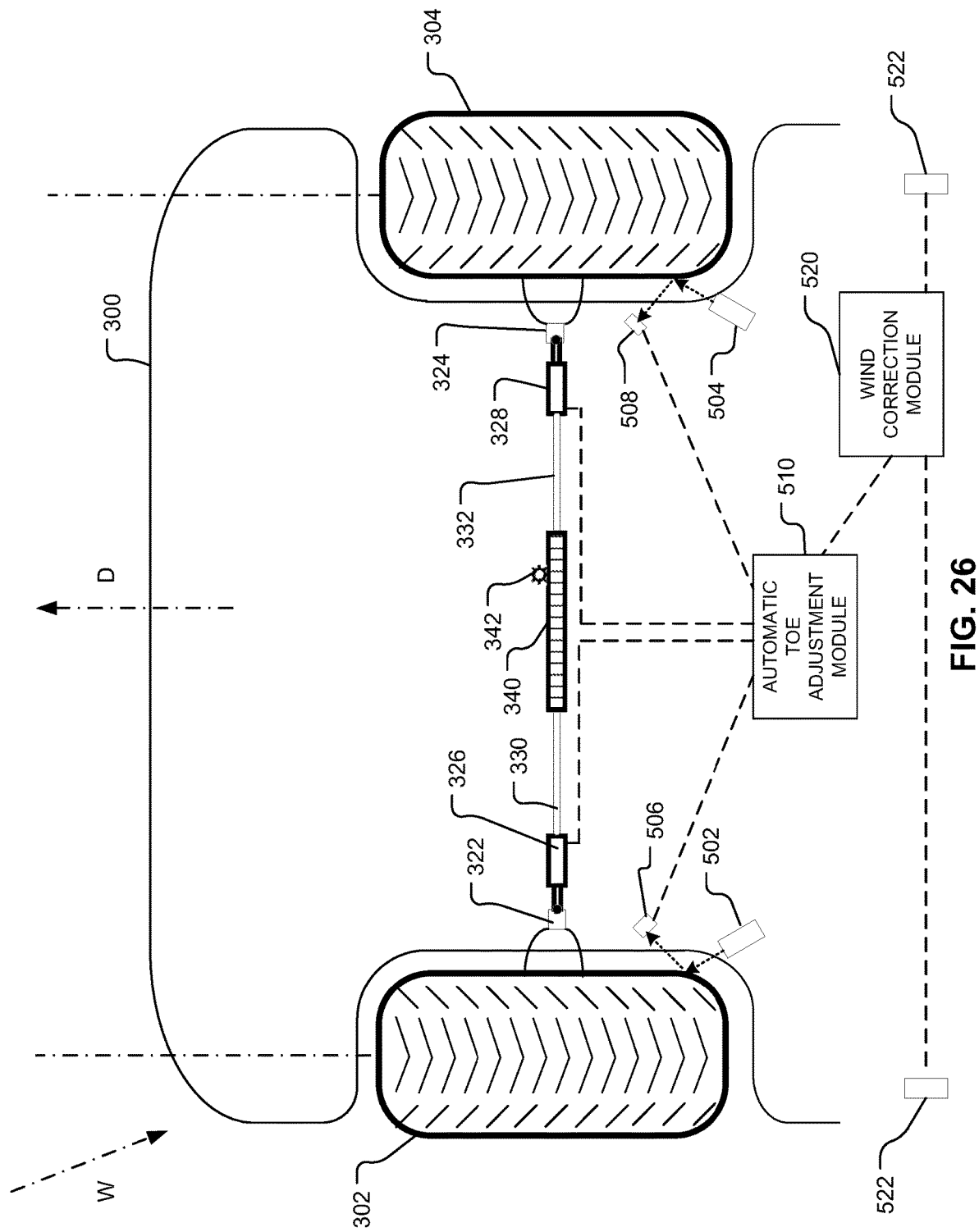
FIG. 26 depicts a steering mechanism with an automatic toe adjustment module and a wind correction module.

In another aspect of this disclosure, FIG. 26 depicts a steering mechanism with an automatic toe adjustment module 510 and a wind correction module 520. The wind correction module 520 is communicatively connected to wind sensors 522. The wind sensors 522 are capable of measuring wind speed and wind direction. In the example presented in FIG. 26, the wind direction W is at an oblique angle to the direction of travel D. This wind imposes a wind load on the vehicle. The wind correction module 520 computes the force distribution on the vehicle based on the wind speed, wind direction and aerodynamics of the vehicle. The wind correction module 520 uses the force distribution on the vehicle to compute the tendency of the vehicle to veer laterally due to the wind. The wind correction module 520 then computes a toe correction angle and communicates with the automatic toe adjustment module 510 which in turn outputs a control signal to one or more toe-adjusting actuators to adjust the toe of the wheel or wheels to counteract the effect of the wind on the vehicle. The automatic toe adjustment module 510 also optionally receives other inputs or signals from the vehicle dynamics production module 105 (e.g. centrifugal force at a corner, road gradient). The automatic toe adjustment module 510 uses the various inputs or signals to control the toe-adjusting actuators to thereby adjust the toe of the wheels based on multiple factors including the wind. In one implementation, the vehicle dynamics prediction module 105 obtains wind data from a server for locations along a roadway and computes the wind loads on the vehicle at each of the upcoming locations using the wind direction and wind speed as well as the orientation of the car at each of the locations along the roadway. At different locations along the roadway, the vehicle will have a different orientation relative to the wind direction and thus produces a different wind load on the vehicle. By predicting the wind-induced dynamics condition at various locations along the road, the vehicle dynamics prediction module 105 can pre-emptively adjust the steering geometry, e.g. toe angles of the wheels, based on the dynamics condition for upcoming locations along the road.

In one embodiment, the wind correction module 520 stores a plurality of orientation-specific drag coefficients for each one of a plurality of vehicle orientations. In one example, the wind correction module 520 stores 360 orientation-specific drag coefficients for each single degree of vehicle orientation relative to the wind. As another example, the wind correction module 520 stores 36 orientation-specific drag coefficients for each sector of 10 degrees of vehicle orientation relative to the wind. As a further example, the wind correction module 520 stores 12 orientation-specific drag coefficients for each sector of 30 degrees of vehicle orientation relative to the wind. As yet a further example, the wind correction module 520 stores 8 orientation-specific drag coefficients for each sector of 45 degrees of vehicle orientation relative to the wind. Using pre-determined and pre-stored orientation-specific drag coefficients, the wind correction module 520 is able to rapidly look up the drag coefficient corresponding to the sensed direction of wind and then compute the wind load on the vehicle due to the wind at the particular orientation of the vehicle relative to the wind direction. Further details about the wind loads and orientation-specific drag coefficients are described below.

Figure 27:
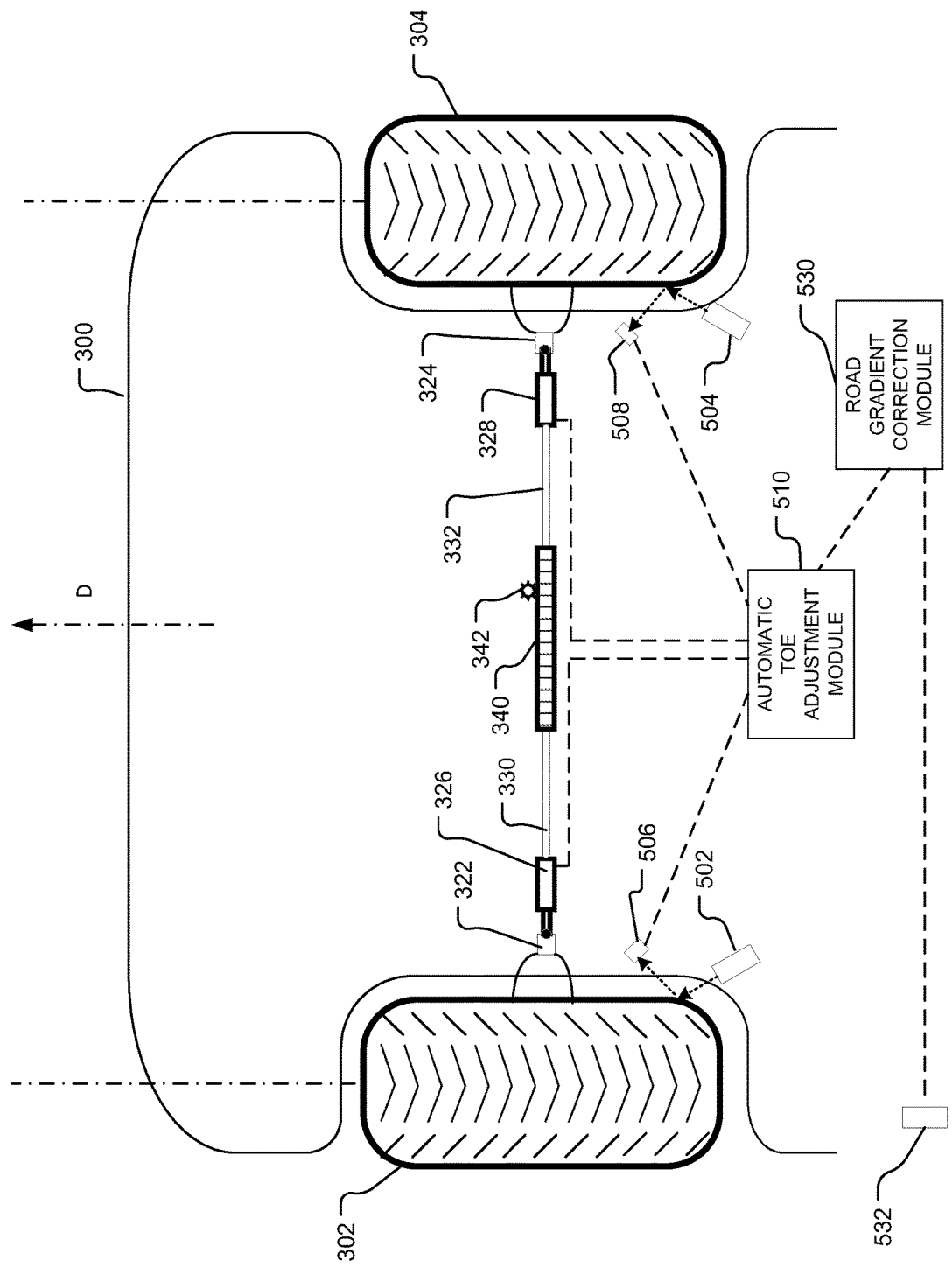
FIG. 27 depicts a steering mechanism with an automatic toe adjustment module and a road gradient correction module.

FIG. 27 depicts a steering mechanism with an automatic toe adjustment module 510 and a road gradient correction module 530. The road gradient correction module 530 cooperates with the automatic toe adjustment module 510 to adjust the toe of one or more wheels based on the road gradient. The road gradient (lateral road slope) may be sensed by a forward-looking sensor 532 mounted on the vehicle or it may be downloaded over the air from a remote server storing a database of location-tagged road gradients.

Figure 28:
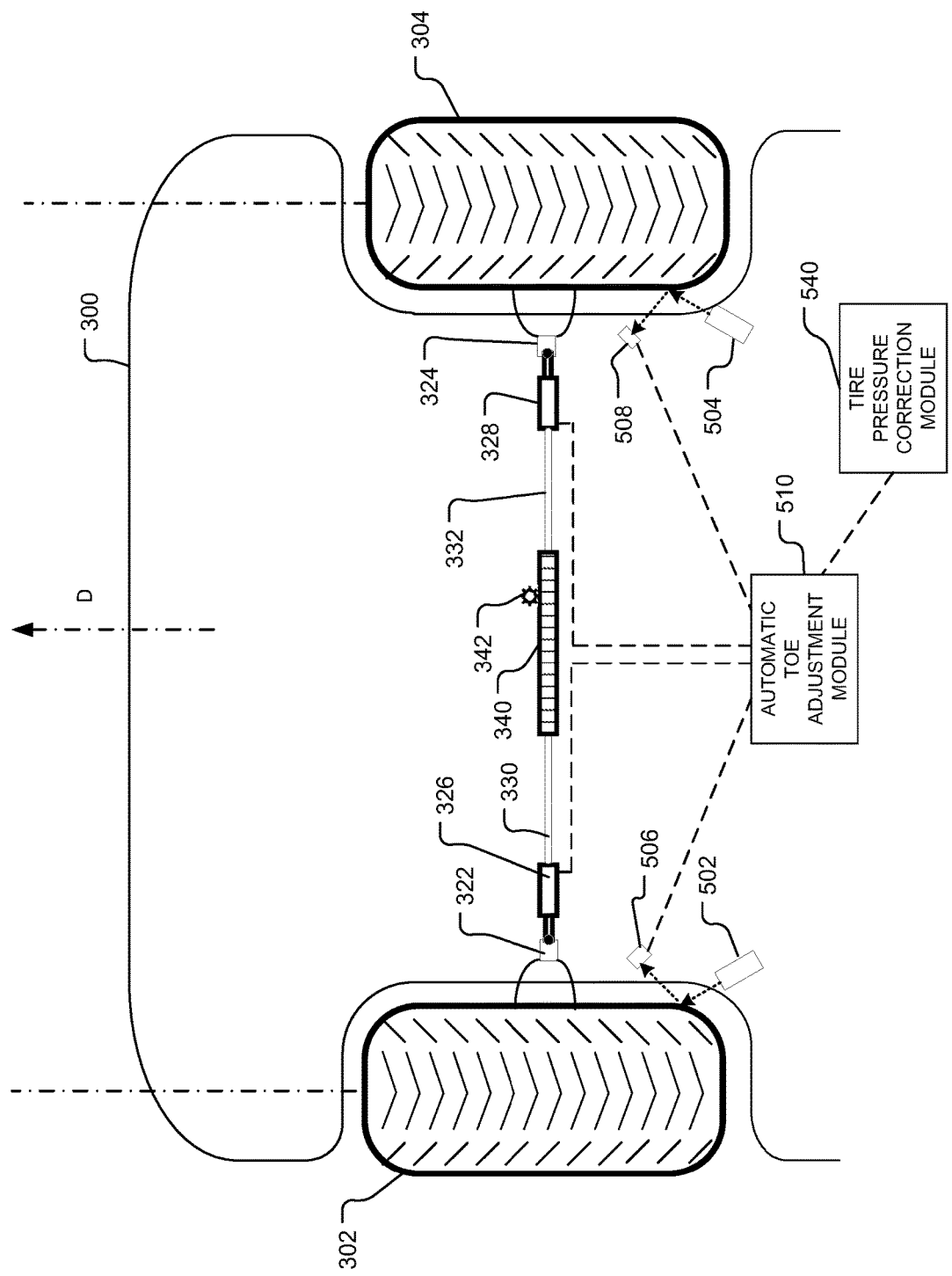
FIG. 28 depicts a steering mechanism with an automatic toe adjustment module and a tire pressure correction module.

FIG. 28 depicts a steering mechanism with an automatic toe adjustment module 510 and a tire pressure correction module 540. The tire pressure correction module 540 receives tire pressures from tire pressure-monitoring sensors associated with the tires on the wheels of the vehicle 10. The tire pressure correction module 540 determines if there is a lateral imbalance or asymmetry in the tire pressures that is sufficiently large to cause the vehicle to track or veer to one side. If the tire pressure correction module 540 determines that a corrective inflation or deflation cannot be performed within a predetermined time, the tire pressure correction module 540 generates and outputs a signal to the automatic toe adjustment module 510 to effect a toe adjustment on one or more of the wheels. The automatic toe adjustment module 510, upon receipt of the signal from the tire pressure correction module 540, processes the signal, determines if other corrective signals from other modules require action, and outputs a control signal to adjust the toe of the one or more wheels so as to compensate for the lateral imbalance in tire pressure.

Figure 29:
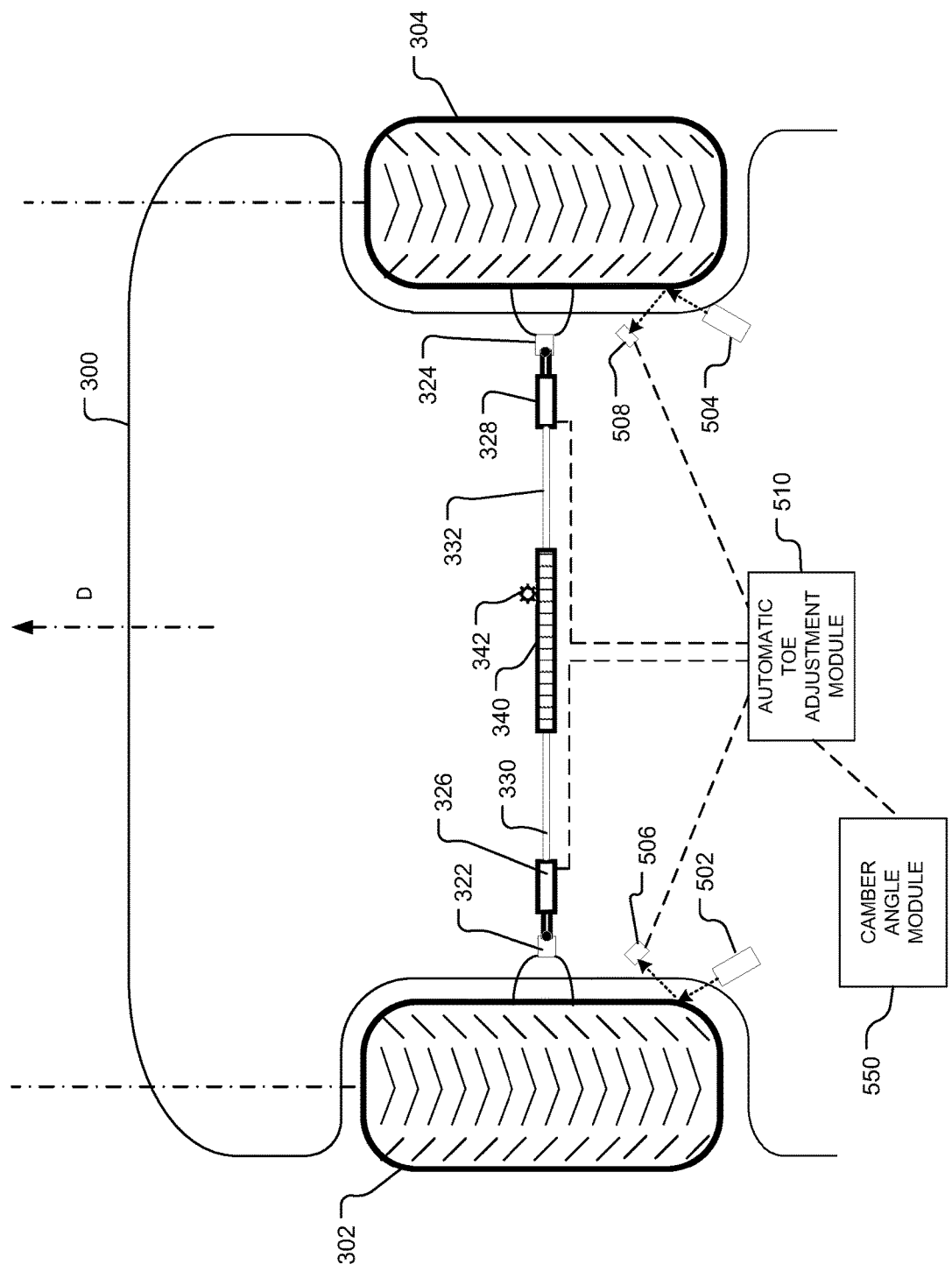
FIG. 29 depicts a steering mechanism with an automatic toe adjustment module and a camber angle module.

FIG. 29 depicts a steering mechanism with an automatic toe adjustment module 510 and a camber angle module 550. The camber angle module 550 obtains camber angles for the wheels, computes optimized toe angles based on the camber angles, and then communicates a recommended camber-specific toe angle for one or more wheels to the automatic toe adjustment module 510. Upon receipt of the recommended camber-specific toe angle, the automatic toe adjustment module 510 determines a toe adjustment using both the recommended camber-specific toe angle and an output from the vehicle dynamics prediction module 105 and also optionally from other modules such as the wind correction module or the gradient correction module.

Figure 30:
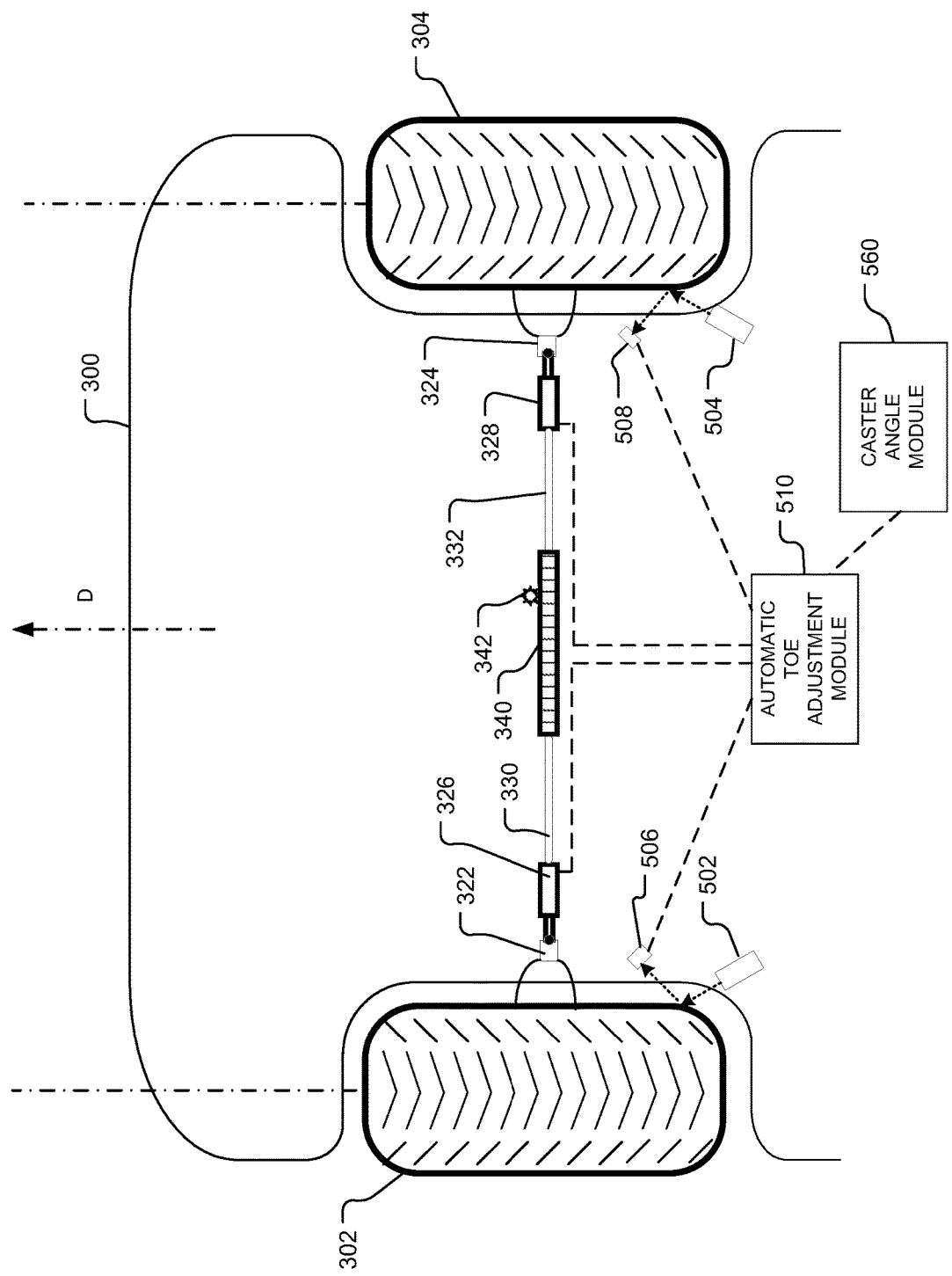
FIG. 30 depicts a steering mechanism with an automatic toe adjustment module and a caster angle module.

FIG. 30 depicts a steering mechanism with an automatic toe adjustment module 510 and a caster angle module 560. The caster angle module 560 obtains caster angles for the wheels, computes optimized toe angles based on the caster angles, and then communicates a recommended caster-specific toe angle for one or more wheels to the automatic toe adjustment module 510. Upon receipt of the recommended caster-specific toe angle, the automatic toe adjustment module 510 determines a toe adjustment using both the recommended caster-specific toe angle and an output from the vehicle dynamics prediction module 105 and also optionally from other modules such as the wind correction module or the gradient correction module.

Figure 31:
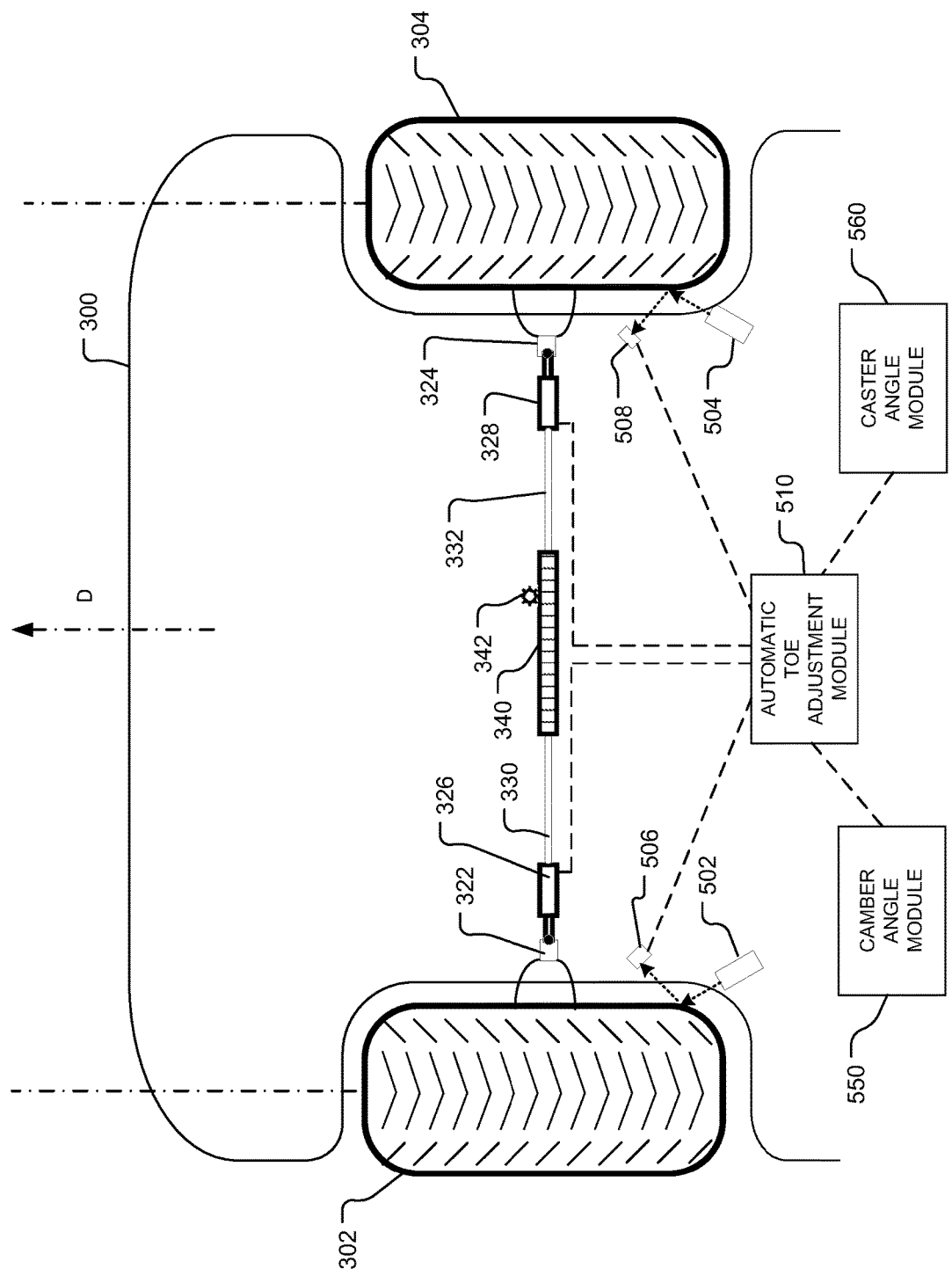
FIG. 31 depicts a steering mechanism with an automatic toe adjustment module and both camber and caster angle modules.

FIG. 31 depicts a steering mechanism with an automatic toe adjustment module 510 and both camber and caster angle modules 550, 560. The automatic toe adjustment module 510 receives both recommended camber-specific toe angles and recommended caster-specific toe angles from the respective camber and caster angle modules 550, 560. Upon receipt of the recommended camber-specific toe angle and recommended caster-specific toe angle, the automatic toe adjustment module 510 determines a toe adjustment using both the recommended caster-specific toe angle and the recommended caster-specific toe angle and an output from the vehicle dynamics prediction module 105 and also optionally from other modules such as the wind correction module or the gradient correction module.

Figure 32:
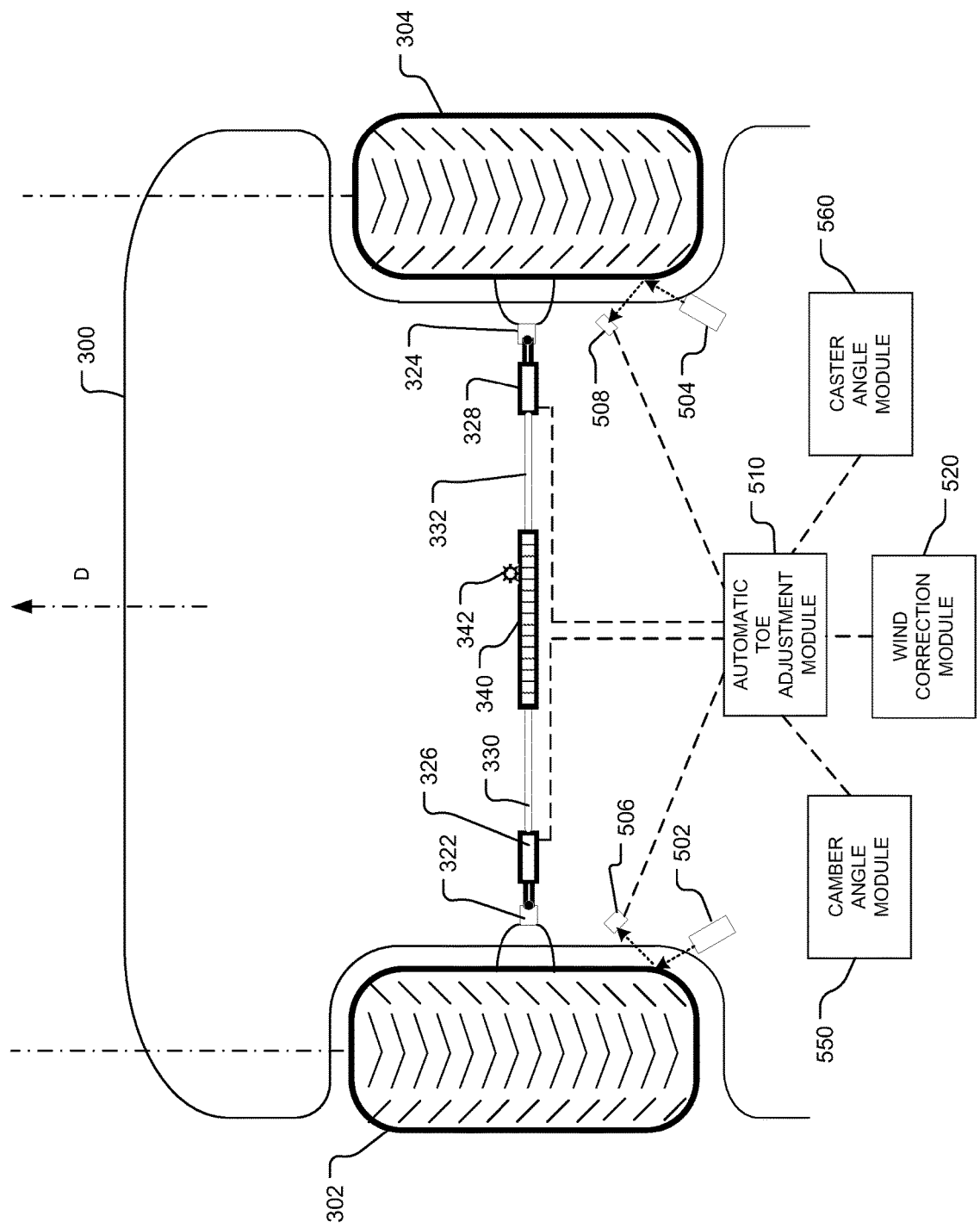
FIG. 32 depicts a steering mechanism with an automatic toe adjustment module, camber and caster angle modules and a wind correction module.

FIG. 32 depicts the steering mechanism with the automatic toe adjustment module 510, the camber angle module 550, the caster angle module 560 and the wind correction module 520. In this exemplary implementation, the automatic toe adjustment module 510 receives data from the camber angle module 550, the caster angle module 560 and the wind correction module 520. The camber angle module 550, the caster angle module 560 and the wind correction module 520 may independently push data to the automatic toe adjustment module 510 at prescribed intervals or when data becomes available due a change in condition. Alternatively, the automatic toe adjustment module 510 may pull data (i.e. request data) from the camber angle module 550, the caster angle module 560 and the wind correction module 520 at periodic intervals or when the vehicle dynamics prediction module 105 asks for updated data. The wind correction module may also compensates for both wind-induced roll and wind-induced yaw by adjusting the steering geometry and the camber and/or caster of the wheels.

Figure 33:
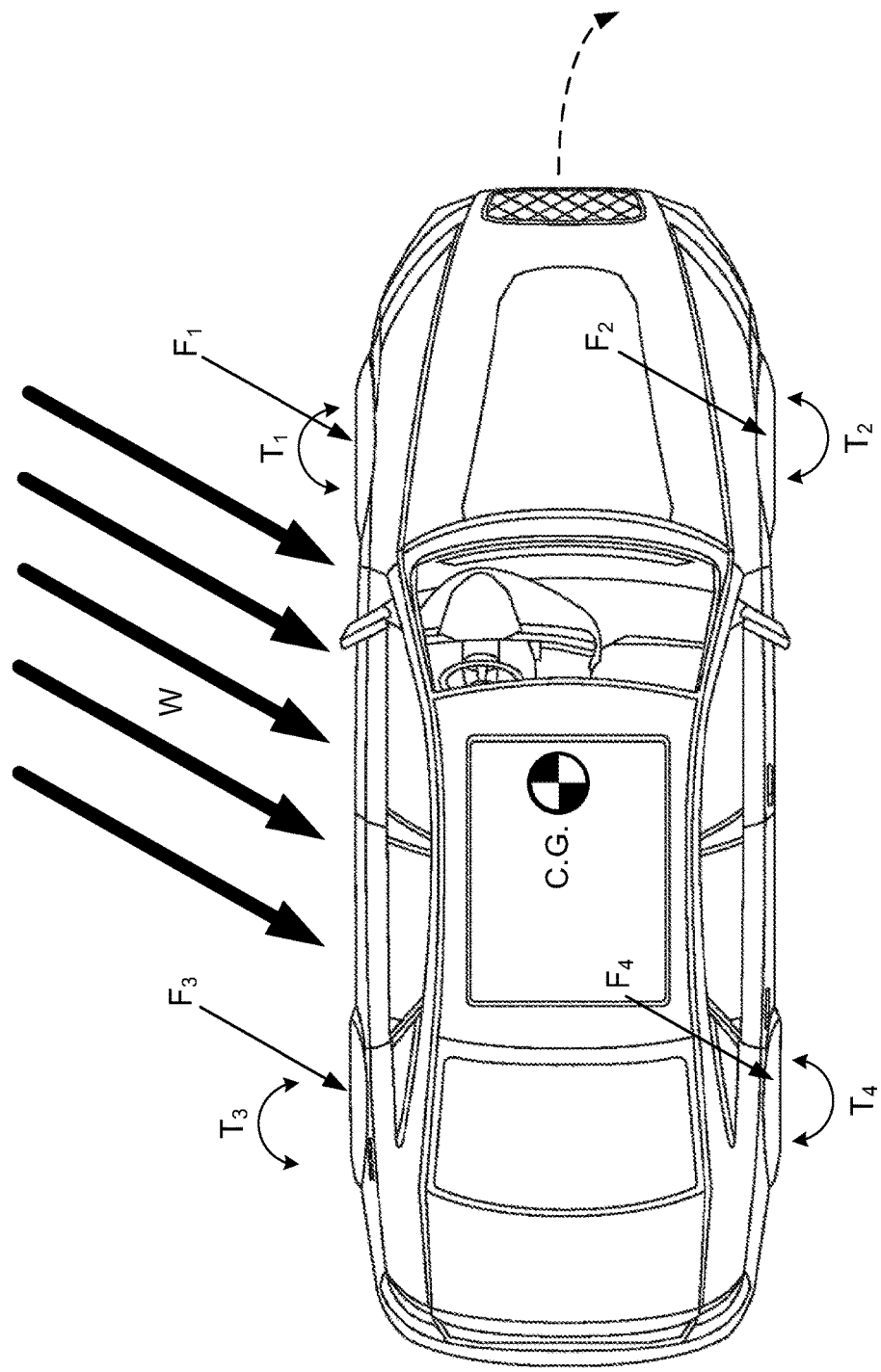
FIG. 33 depicts a top plan view of the vehicle subjected to an oblique wind load.

FIG. 33 depicts a top plan view of the vehicle subjected to an oblique wind load. The wind direction W in this example is oblique to the direction of travel of the vehicle. This wind load imparts forces on each of the wheels which are denoted $F_1$, $F_2$, $F_3$ and $F_4$. The wheels may also be subjected to torques which are denoted $T_1$, $T_2$, $T_3$ and $T_4$. The wind load on the vehicle may be computed in one embodiment using an orientation-specific drag coefficient for the vehicle corresponding to the relative angle or orientation of the vehicle and the wind. To expedite the calculation, the vehicle dynamics prediction module 105 or another module such as the wind correction module 520 may utilize a pre-computed or predetermined orientation-specific drag coefficient. In one embodiment, the vehicle has a memory accessible by the wind correction module or vehicle dynamics prediction module 105 that stores a plurality of pre-computed or predetermined orientation-specific drag coefficients as introduced above with respect to the wind correction module 520. For example, as described above, there may be 360 different drag coefficients for each single degree of orientation around the vehicle. For computational efficiency, there may be a lesser number of drag coefficients for angular sectors or orientations. For example, there may be 36 orientation-specific drag coefficients for each 10-degree sector or 72 orientation-specific drag coefficients for each 5-degree sector. For even greater computational efficiency, there may be 10 orientation-specific drag coefficients for each 36-degree sector or 12 orientation-specific drag coefficients for each 30-degree sector. For still further computational efficiency, there may be 8 orientation-specific drag coefficients for each 45-degree sector. Once the wind correction module 520 computes the orientation-specific wind load on the vehicle, the forces and torques can be computed on each wheel of the vehicle using the center of gravity (CG) of the vehicle. The wind correction module 520 then computes the wind-induced yaw of the vehicle. The yaw indicates how much the vehicle will veer or drift off the steered direction of travel due to the wind. The wind correction module 520 may adjust the steering geometry to compensate for the wind-induced yaw. The wind correction module 520 may compensate for the wind-induced yaw by adjusting the toe of one or more of the wheels of the vehicle.

Figure 34:
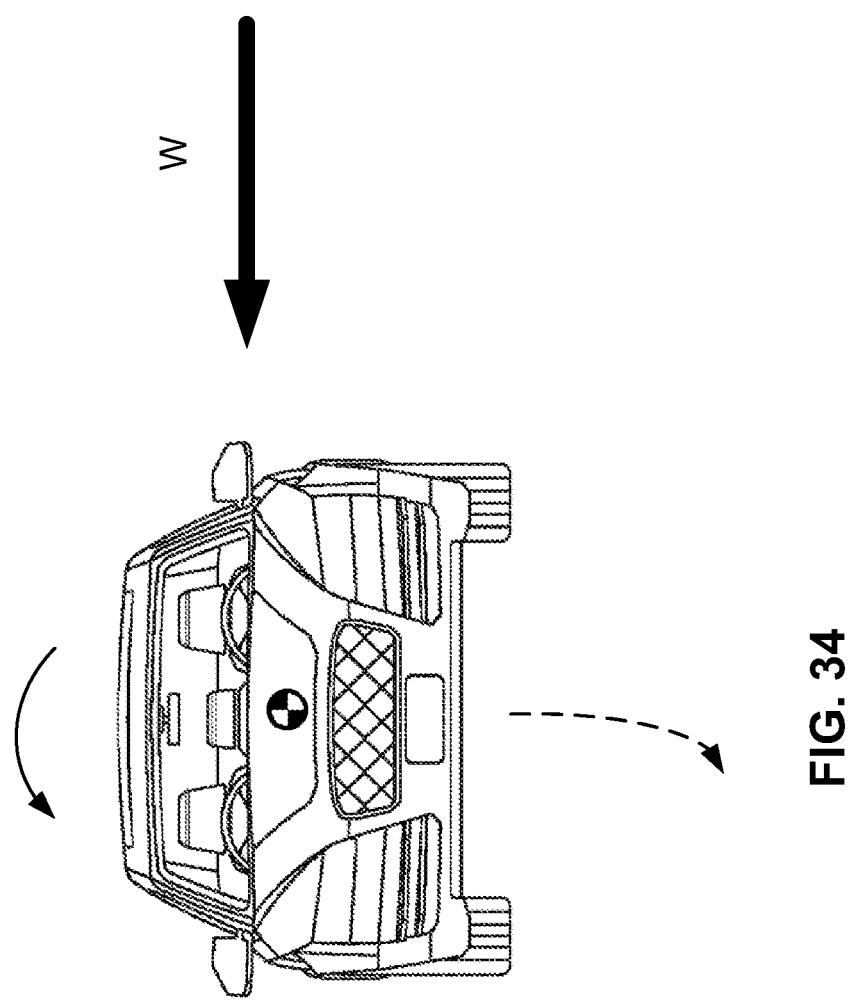
FIG. 34 depicts a front view of the vehicle subjected to a side wind load.

FIG. 34 depicts a front view of the vehicle subjected to a side oblique wind load. This side oblique wind load on the vehicle is asymmetrical about the center of gravity and thus not only induces a yaw as described above but also induces a roll. The wind correction module 520 may furthermore compensate for the wind-induced roll by adjusting the steering geometry and/or the camber and/or caster of the wheels. The compensation for wind-induced yaw and/or wind-induced roll may be done in response to sensed wind speed and direction. Alternatively, it may be done preemptively by initiating the adjustment in anticipation of the wind load. For example, the vehicle may download wind data for the road along which the vehicle is traveling from a server that receives wind data from other vehicles. Alternatively, the vehicle (i.e. a first vehicle) may obtain wind data using V2V communications from another vehicle (i.e. a second vehicle) that is traveling ahead of the first vehicle. Regardless of how it obtains the wind data, the vehicle may thus prepare for windy conditions or wind gusts that are expected along the road by adjusting the steering geometry such as adjusting one or more toe angles of the wheel(s). For example, a vehicle emerging from a tunnel where it is sheltered from the wind might suddenly encounter high winds. The wind correction module of the vehicle can pre-emptively adjust the steering geometry and/or wheel geometry (camber and/or caster) to improve vehicle tracking and/or stability for the windy condition. The wind correction module of the vehicle can synchronize the adjustments of the steering geometry and/or wheel geometry to be completed to correspond temporally with the arrival of the vehicle at the windy location. The wind correction module can synchronize the adjustments using an actuator adjustment rate of the toe-adjusting actuators and the vehicle speed (and thus the estimated time of arrival at the windy location).

In a further embodiment, the wind correction module 520 may cause the vehicle to actuate an aerodynamic component of the vehicle to move or adjust the aerodynamic component (e.g. rear spoiler, air dam, side skirts, diffuser) to compensate for the wind load.

In another implementation, the wind correction calculations may be performed by the vehicle dynamics prediction module 105 or in cooperation with the vehicle dynamics prediction module 105. In another implementation, the wind correction calculations may be performed by the server 250 with the vehicle dynamics prediction module 105 or in cooperation with the vehicle dynamics prediction module 105.

Figure 35:
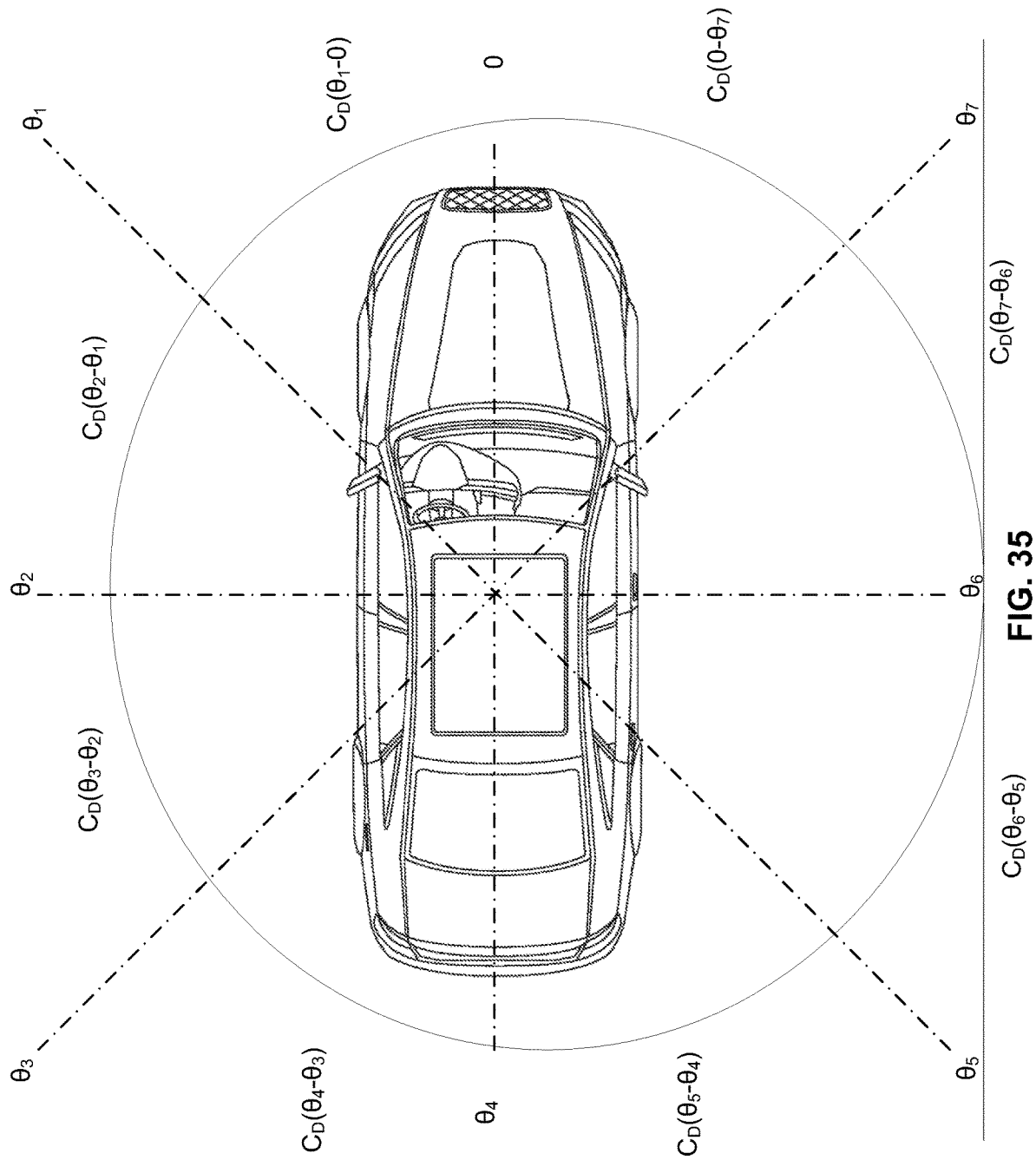
FIG. 35 depicts a top plan view of a vehicle and orientation-specific drag coefficients for various angular sectors around the vehicle to enable rapid computation of orientation-specific wind loads and the resulting forces and torques acting on the wheels of the vehicle.

FIG. 35 depicts a top plan view of a vehicle and orientation-specific drag coefficients for various angular sectors around the vehicle to enable rapid computation of orientation-specific wind loads and the resulting forces and torques acting on the wheels of the vehicle. In this example, there are 8 orientation-specific drag coefficients that the wind correction module 520 uses to calculate the wind load on the vehicle. In operation, the wind correction module 520 receives data representing a wind speed and a wind direction. The wind speed and wind direction may be obtained from wind sensor or multiple wind sensors on the vehicle. In one implementation, the vehicle may have a plurality of wind sensors disposed around the vehicle to measure the wind speed and direction from various orientations around the vehicle. The wind sensors may, in one embodiment, be pitot tubes installed in the body of the vehicle. In a variant, the pitot tubes may be heated pitot tubes to prevent them from becoming clogged with snow or ice.

In alternative implementations, the vehicle dynamics prediction module 105 receives data directly from one or more of the wind correction module 520, the road gradient correction module 530, the tire pressure correction module 540, the camber angle module 550, and the caster angle module 560.

In another embodiment, the vehicle dynamics prediction module 105 receives a traction-mode signal indicating a traction mode of the vehicle, e.g. all-wheel drive, rear-wheel drive, front-wheel drive. Depending on the traction mode, the vehicle dynamics prediction module 105 in this embodiment pre-emptively and automatically adjusts the steering geometry (e.g. the toe angle and/or Ackerman angle) based on the traction mode of the vehicle. In a variant, the vehicle dynamics prediction module 105 pre-emptively and automatically adjusts both the steering geometry and the wheel geometry (e.g. camber and/or caster) based on the traction mode of the vehicle. For example, in one implementation, if the vehicle dynamics prediction module 105 receives a traction-mode signal indicating that the traction mode is front-wheel drive, the vehicle dynamics prediction module 105 pre-emptively and automatically adjusts the steering geometry to make the front wheels toe-in. In this implementation, if the vehicle dynamics prediction module 105 receives a traction-mode signal indicating that the traction mode is rear-wheel drive, the vehicle dynamics prediction module 105 pre-emptively and automatically adjusts the steering geometry to make the rear wheels toe-in.

Another aspect of the invention is a method of dynamically adjusting the steering geometry of an autonomous vehicle. The method entails executing by a processor a vehicle dynamics prediction module to predict forces on the wheel or wheels (i.e. the vehicle dynamics condition). The method involves outputting a control signal based on the vehicle dynamics condition, e.g. the predicted force or forces on the wheel or wheels. One control signal per wheel may be output in some embodiments. The method further involves controlling a steering geometry adjustment mechanism connected to the steering mechanism to automatically adjust the steering geometry of in response to the control signal.

Another aspect of the invention is a method of dynamically realigning the wheels of an autonomous vehicle. The method entails sensing toe angles of left and right wheels, comparing the sensed left and right toe angles to preset left and right toe angles, and automatically adjusting the toe angle of one or both of the wheels to thereby realign one or both of the wheels.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An autonomous vehicle comprising:
a chassis;
a pair of front wheels rotationally mounted to the chassis;
a single rack-and-pinion steering mechanism having a single rack engaged by a single pinion for steering the autonomous vehicle and further having steering arms connected to the front wheels, wherein the steering mechanism is characterized by a steering geometry and wherein the steering arms are mechanically coupled by a transverse linkage that includes the rack such that the front wheels are mechanically coupled and thereby steered together;
a vehicle dynamics prediction module executed by a processor for predicting a vehicle dynamics condition and for generating a control signal based on the vehicle dynamics condition, wherein the vehicle dynamics prediction module receives location data from a positioning system and determines a vehicle path and cornering forces for a curve in the vehicle path to predict the vehicle dynamics condition using also a predicted speed of the vehicle in the curve; and
a steering geometry adjustment mechanism connected to the steering mechanism for automatically adjusting the steering geometry in response to the control signal prior to reaching the curve,
wherein the steering geometry adjustment mechanism comprises a single Ackerman-adjusting actuator to adjust an Ackerman steering angle in response to the control signal, wherein the Ackerman steering angle is defined as an angle between intersecting projections of the steering arms,
wherein the steering geometry adjustment mechanism further comprises left and right toe-adjusting actuators that are adjustable independently of the Ackerman-adjusting actuator, to adjust left and right toe angles in response to the control signal to thereby readjust the left and right toe angles in response to an adjustment in the Ackerman steering angle made by the Ackerman-adjusting actuator.

2. The autonomous vehicle of claim 1 wherein the processor executing the vehicle dynamics prediction module cooperates with a memory to store a plurality of orientation-specific drag coefficients for a plurality of angular sectors entirely surrounding the vehicle, wherein the processor computes an orientation-specific wind load on the vehicle based on a sensed wind speed and wind direction relative to the vehicle and one of the plurality of orientation-specific drag coefficients, wherein the processor further computes wind-induced torques acting in a horizontal plane on the wheels using a center of gravity of the autonomous vehicle and wherein the processor further causes adjustment of the steering geometry.

3. The autonomous vehicle of claim 1 wherein the processor executing the vehicle dynamics prediction module cooperates with a data transceiver to receive wind data from a server, the wind data defining an expected wind speed and wind direction at an upcoming location to enable the vehicle dynamics prediction module to pre-emptively determine an expected wind load, wherein the vehicle dynamics prediction module computes wind-induced torques acting in a horizontal plane on the wheels using a center of gravity of the autonomous vehicle, and pre-emptively compensates for wind-induced roll and wind-induced yaw by adjusting the steering geometry prior to arriving at the location of the expected wind load.

4. The autonomous vehicle of claim 3 wherein the data transceiver also downloads lateral road slope data to further adjust the steering geometry.

5. The autonomous vehicle of claim 1 further comprising a camber adjustment actuator to adjust a camber of the wheels in response to the control signal.

6. The autonomous vehicle of claim 5 further comprising a caster adjustment actuator to adjust a caster of the wheels in response to the control signal.

7. The autonomous vehicle of claim 1 further comprising a master selector to switch between an automatic adjustment mode and a manual adjustment mode, wherein the vehicle dynamics prediction module automatically adjusts the steering geometry the in the automatic adjustment mode, and wherein, in the manual adjustment mode, the user can select the toe angles.

8. The autonomous vehicle of claim 7 comprising a dashboard display to graphically or pictorially show a representation of the wheels of the autonomous vehicle to show how much toe is applied to the wheels.

9. The autonomous vehicle of claim 8 wherein the dashboard display shows how the steering geometry is changing while cornering.

10. The autonomous vehicle of claim 9 wherein the dashboard display presents an enlarged view of the front wheels and a slow-motion animation of a changing toe angle.

* * * * *